US010339765B2

(12) United States Patent
Nagaragatta et al.

(10) Patent No.: US 10,339,765 B2
(45) Date of Patent: Jul. 2, 2019

(54) DEVICES, SYSTEMS, AND RELATED METHODS FOR REAL-TIME MONITORING AND DISPLAY OF RELATED DATA FOR CASINO GAMING DEVICES

(71) Applicant: Shuffle Master GmbH & Co KG, Vienna (AT)

(72) Inventors: Ravi Nagaragatta, Bangalore (IN); Georg Fekete, Korneuburg (AT)

(73) Assignee: Shuffle Master GmbH & Co KG, Vienna (AT)

( * ) Notice: Subject to any disclaimer, the term of this patent is extended or adjusted under 35 U.S.C. 154(b) by 0 days.

(21) Appl. No.: 15/276,476

(22) Filed: Sep. 26, 2016

(65) Prior Publication Data

US 2018/0089956 A1 Mar. 29, 2018

(51) Int. Cl.

| | |
|---|---|
| ***A63F 9/24*** | (2006.01) |
| ***A63F 13/00*** | (2014.01) |
| ***G06F 17/00*** | (2019.01) |
| ***G06F 19/00*** | (2018.01) |

(Continued)

(52) U.S. Cl.
CPC ............ *G07F 17/3293* (2013.01); *A63F 1/12* (2013.01); *G07F 17/322* (2013.01); *G07F 17/3202* (2013.01); *G07F 17/3211* (2013.01); *G07F 17/3225* (2013.01); *G07F 17/3234* (2013.01)

(58) Field of Classification Search
CPC ............. G07F 17/3293; G07F 17/3211; G07F 17/322; G07F 17/3225
See application file for complete search history.

(56) References Cited

U.S. PATENT DOCUMENTS

| | | | |
|---|---|---|---|
| 130,281 | A | 8/1872 | Coughlin |
| 205,030 | A | 6/1878 | Ash |
| 609,730 | A | 8/1898 | Booth |

(Continued)

FOREIGN PATENT DOCUMENTS

| | | | |
|---|---|---|---|
| AU | 2383667 | A | 1/1969 |
| AU | 5025479 | A1 | 3/1980 |

(Continued)

OTHER PUBLICATIONS

1/3" B/W CCD Camera Module EB100 by EverFocus Electronics Corp., Jul. 31, 2001, 3 pgs.

(Continued)

*Primary Examiner* — Kevin Y Kim
(74) *Attorney, Agent, or Firm* — TraskBritt

(57) ABSTRACT

A monitoring system for monitoring casino gaming devices through a casino network is disclosed. The monitoring includes casino gaming devices configured to generate performance data and transmit the data corresponding to the monitored usage of the casino gaming devices over a casino network, a monitoring server configured to store and manage a database including the game data received from the casino gaming devices, and an operator station configured to retrieve and display the game data on a graphical user interface having icons that display real-time operational parameters of the casino gaming devices. A related method for gathering and maintaining operational performance indicators for a plurality of casino table devices operably coupled to a casino network including a middleware server and a client terminal is also disclosed.

18 Claims, 15 Drawing Sheets

(51) Int. Cl.

| | |
|---|---|
| ***G07F 17/32*** | (2006.01) |
| ***A63F 1/12*** | (2006.01) |

(56) References Cited

U.S. PATENT DOCUMENTS

| | | | |
|---|---|---|---|
| 673,154 | A | 4/1901 | Bellows |
| 793,489 | A | 6/1905 | Williams |
| 892,389 | A | 7/1908 | Bellows |
| 1,014,219 | A | 1/1912 | Hall |
| 1,043,109 | A | 11/1912 | Hurm |
| 1,157,898 | A | 10/1915 | Perret |
| 1,256,509 | A | 2/1918 | Belknap |
| 1,380,898 | A | 6/1921 | Hall |
| 1,992,085 | A | 2/1925 | McKay |
| 1,556,856 | A | 10/1925 | Lipps |
| 1,850,114 | A | 6/1929 | McCaddin |
| 1,757,553 | A | 5/1930 | Gustav |
| 1,885,276 | A | 11/1932 | McKay |
| 1,889,729 | A | 11/1932 | Hammond |
| 1,955,926 | A | 4/1934 | Matthaey |
| 1,998,690 | A | 4/1935 | Shepherd et al. |
| 2,001,220 | A | 5/1935 | Smith |
| 2,001,918 | A | 5/1935 | Nevius |
| 2,016,030 | A | 10/1935 | Woodruff et al. |
| 2,043,343 | A | 6/1936 | Warner |
| 2,060,096 | A | 11/1936 | McCoy |
| 2,065,824 | A | 12/1936 | Plass |
| 2,159,958 | A | 5/1939 | Sachs |
| 2,185,474 | A | 1/1940 | Nott |
| 2,254,484 | A | 9/1941 | Hutchins |
| D132,360 | S | 5/1942 | Gardner |
| 2,328,153 | A | 8/1943 | Laing |
| 2,328,879 | A | 9/1943 | Isaacson |
| D139,530 | S | 11/1944 | Schindler |
| 2,364,413 | A | 12/1944 | Wittel |
| 2,525,305 | A | 10/1950 | Lombard |
| 2,543,522 | A | 2/1951 | Cohen |
| 2,588,582 | A | 3/1952 | Sivertson |
| 2,615,719 | A | 10/1952 | Fonken |
| 2,659,607 | A | 11/1953 | Skillman et al. |
| 2,661,215 | A | 12/1953 | Stevens |
| 2,676,020 | A | 4/1954 | Ogden |
| 2,692,777 | A | 10/1954 | Miller |
| 2,701,720 | A | 2/1955 | Ogden |
| 2,705,638 | A | 4/1955 | Newcomb |
| 2,711,319 | A | 6/1955 | Morgan et al. |
| 2,714,510 | A | 8/1955 | Oppenlander et al. |
| 2,717,782 | A | 9/1955 | Droll |
| 2,727,747 | A | 12/1955 | Semisch, Jr. |
| 2,731,271 | A | 1/1956 | Brown |
| 2,747,877 | A | 5/1956 | Howard |
| 2,755,090 | A | 7/1956 | Aldrich |
| 2,757,005 | A | 7/1956 | Nothaft |
| 2,760,779 | A | 8/1956 | Ogden et al. |
| 2,770,459 | A | 11/1956 | Wilson et al. |
| 2,778,643 | A | 1/1957 | Williams |
| 2,778,644 | A | 1/1957 | Stephenson |
| 2,782,040 | A | 2/1957 | Matter |
| 2,790,641 | A | 4/1957 | Adams |
| 2,793,863 | A | 5/1957 | Liebelt |
| 2,815,214 | A | 12/1957 | Hall |
| 2,821,399 | A | 1/1958 | Heinoo |
| 2,914,215 | A | 11/1959 | Neidig |
| 2,937,739 | A | 5/1960 | Levy |
| 2,950,005 | A | 8/1960 | MacDonald |
| RE24,986 | E | 5/1961 | Stephenson |
| 3,067,885 | A | 12/1962 | Kohler |
| 3,107,096 | A | 10/1963 | Osborn |
| 3,124,674 | A | 3/1964 | Edwards et al. |
| 3,131,935 | A | 5/1964 | Gronneberg |
| 3,147,978 | A | 9/1964 | Sjostrand |
| D200,652 | S | 3/1965 | Fisk |
| 3,222,071 | A | 12/1965 | Lang |
| 3,235,741 | A | 2/1966 | Plaisance |
| 3,288,308 | A | 11/1966 | Gingher |
| 3,305,237 | A | 2/1967 | Granius |
| 3,312,473 | A | 4/1967 | Friedman et al. |
| 3,452,509 | A | 7/1969 | Hauer |
| 3,530,968 | A | 9/1970 | Palmer |
| 3,588,116 | A | 6/1971 | Miura |
| 3,589,730 | A | 6/1971 | Slay |
| 3,595,388 | A | 7/1971 | Castaldi |
| 3,597,076 | A | 8/1971 | Hubbard et al. |
| 3,598,396 | A | 8/1971 | Andrews et al. |
| 3,618,933 | A | 11/1971 | Roggenstein et al. |
| 3,627,331 | A | 12/1971 | Erickson |
| 3,666,270 | A | 5/1972 | Mazur |
| 3,680,853 | A | 8/1972 | Houghton et al. |
| 3,690,670 | A | 9/1972 | Cassady et al. |
| 3,704,938 | A | 12/1972 | Fanselow |
| 3,716,238 | A | 2/1973 | Porter |
| 3,751,041 | A | 8/1973 | Seifert |
| 3,761,079 | A | 9/1973 | Azure, Jr. |
| 3,810,627 | A | 5/1974 | Levy |
| D232,953 | S | 9/1974 | Oguchi |
| 3,861,261 | A | 1/1975 | Maxey |
| 3,897,954 | A | 8/1975 | Erickson et al. |
| 3,899,178 | A | 8/1975 | Watanabe |
| 3,909,002 | A | 9/1975 | Levy |
| 3,929,339 | A | 12/1975 | Mattioli |
| 3,944,077 | A | 3/1976 | Green |
| 3,944,230 | A | 3/1976 | Fineman |
| 3,949,219 | A | 4/1976 | Crouse |
| 3,968,364 | A | 7/1976 | Miller |
| 4,023,705 | A | 5/1977 | Reiner et al. |
| 4,033,590 | A | 7/1977 | Pic |
| 4,072,930 | A | 2/1978 | Lucero et al. |
| 4,088,265 | A | 5/1978 | Garczynski |
| 4,151,410 | A | 4/1979 | McMillan et al. |
| 4,159,581 | A | 7/1979 | Lichtenberg |
| 4,162,649 | A | 7/1979 | Thornton |
| 4,166,615 | A | 9/1979 | Noguchi et al. |
| 4,232,861 | A | 11/1980 | Maul |
| 4,280,690 | A | 7/1981 | Hill |
| 4,283,709 | A | 8/1981 | Lucero et al. |
| 4,310,160 | A | 1/1982 | Willette et al. |
| 4,339,134 | A | 7/1982 | Macheel |
| 4,339,798 | A | 7/1982 | Hedges et al. |
| 4,361,393 | A | 11/1982 | Nato |
| 4,368,972 | A | 1/1983 | Naramore |
| 4,369,972 | A | 1/1983 | Parker |
| 4,374,309 | A | 2/1983 | Walton |
| 4,377,285 | A | 3/1983 | Kadlic |
| 4,385,827 | A | 5/1983 | Naramore |
| 4,388,994 | A | 6/1983 | Suda et al. |
| 4,397,469 | A | 8/1983 | Carter, III |
| 4,421,312 | A | 12/1983 | Delgado et al. |
| 4,421,501 | A | 12/1983 | Scheffer |
| D273,962 | S | 5/1984 | Fromm |
| D274,069 | S | 5/1984 | Fromm |
| 4,467,424 | A | 8/1984 | Hedges et al. |
| 4,494,197 | A | 1/1985 | Troy et al. |
| 4,497,488 | A | 2/1985 | Plevyak et al. |
| 4,512,580 | A | 4/1985 | Matviak |
| 4,513,969 | A | 4/1985 | Samsel, Jr. |
| 4,515,367 | A | 5/1985 | Howard |
| 4,531,187 | A | 7/1985 | Uhland |
| 4,534,562 | A | 8/1985 | Cuff et al. |
| 4,549,738 | A | 10/1985 | Greitzer |
| 4,566,782 | A | 1/1986 | Britt et al. |
| 4,575,367 | A | 3/1986 | Karmel |
| 4,586,712 | A | 5/1986 | Lorber et al. |
| 4,659,082 | A | 4/1987 | Greenberg |
| 4,662,637 | A | 5/1987 | Pfeiffer |
| 4,662,816 | A | 5/1987 | Fabrig |
| 4,667,959 | A | 5/1987 | Pfeiffer et al. |
| 4,741,524 | A | 5/1988 | Bromage |
| 4,750,743 | A | 6/1988 | Nicoletti |
| 4,755,941 | A | 7/1988 | Bacchi |
| 4,759,448 | A | 7/1988 | Kawabata |
| 4,770,412 | A | 9/1988 | Wolfe |
| 4,770,421 | A | 9/1988 | Hoffman |
| 4,807,884 | A | 2/1989 | Breeding |
| 4,822,050 | A | 4/1989 | Normand et al. |

(56) References Cited

U.S. PATENT DOCUMENTS

| | | | |
|---|---|---|---|
| 4,832,342 A | | 5/1989 | Plevyak et al. |
| 4,858,000 A | | 8/1989 | Lu |
| 4,861,041 A | | 8/1989 | Jones et al. |
| 4,876,000 A | | 10/1989 | Mikhail |
| 4,900,009 A | | 2/1990 | Kitahara et al. |
| 4,904,830 A | | 2/1990 | Rizzuto |
| 4,921,109 A | | 5/1990 | Hasuo et al. |
| 4,926,327 A | | 5/1990 | Sidley |
| 4,948,134 A | | 8/1990 | Suttle et al. |
| 4,951,950 A | | 8/1990 | Normand et al. |
| 4,969,648 A | | 11/1990 | Hollinger et al. |
| 4,993,587 A | | 2/1991 | Abe |
| 4,995,615 A | | 2/1991 | Cheng |
| 5,000,453 A | | 3/1991 | Stevens et al. |
| 5,004,218 A | | 4/1991 | Sardano et al. |
| 5,039,102 A | | 8/1991 | Miller |
| 5,067,713 A | | 11/1991 | Soules et al. |
| 5,078,405 A | | 1/1992 | Jones et al. |
| 5,081,487 A | | 1/1992 | Hoyer et al. |
| 5,096,197 A | | 3/1992 | Embury |
| 5,102,293 A | | 4/1992 | Schneider |
| 5,118,114 A | | 6/1992 | Tucci |
| 5,121,192 A | | 6/1992 | Kazui |
| 5,121,921 A | | 6/1992 | Friedman et al. |
| 5,146,346 A | | 9/1992 | Knoll |
| 5,154,429 A | | 10/1992 | LeVasseur |
| 5,179,517 A | | 1/1993 | Sarbin et al. |
| 5,197,094 A | | 3/1993 | Tillery et al. |
| 5,199,710 A | | 4/1993 | Lamle |
| 5,209,476 A | | 5/1993 | Eiba |
| 5,224,712 A | | 7/1993 | Laughlin et al. |
| 5,240,140 A | | 8/1993 | Huen |
| 5,248,142 A | | 9/1993 | Breeding |
| 5,257,179 A | | 10/1993 | DeMar |
| 5,259,907 A | | 11/1993 | Soules et al. |
| 5,261,667 A | | 11/1993 | Breeding |
| 5,267,248 A | | 11/1993 | Reyner |
| 5,275,411 A | | 1/1994 | Breeding |
| 5,276,312 A | | 1/1994 | McCarthy |
| 5,283,422 A | | 2/1994 | Storch et al. |
| 5,288,081 A | | 2/1994 | Breeding |
| 5,299,089 A | | 3/1994 | Lwee |
| 5,303,921 A | | 4/1994 | Breeding |
| 5,344,146 A | | 9/1994 | Lee |
| 5,356,145 A | | 10/1994 | Verschoor |
| 5,362,053 A | | 11/1994 | Miller |
| 5,374,061 A | | 12/1994 | Albrecht |
| 5,377,973 A | | 1/1995 | Jones et al. |
| 5,382,024 A | | 1/1995 | Blaha |
| 5,382,025 A | | 1/1995 | Sklansky et al. |
| 5,390,910 A | | 2/1995 | Mandel et al. |
| 5,397,128 A | | 3/1995 | Hesse et al. |
| 5,397,133 A | | 3/1995 | Penzias |
| 5,416,308 A | | 5/1995 | Hood et al. |
| 5,431,399 A | | 7/1995 | Kelley |
| 5,431,407 A | | 7/1995 | Hofberg et al. |
| 5,437,462 A | | 8/1995 | Breeding |
| 5,445,377 A | | 8/1995 | Steinbach |
| 5,470,079 A | | 11/1995 | LeStrange et al. |
| D365,853 S | | 1/1996 | Zadro |
| 5,489,101 A | | 2/1996 | Moody |
| 5,515,477 A | | 5/1996 | Sutherland |
| 5,524,888 A | | 6/1996 | Heidel |
| 5,531,448 A | | 7/1996 | Moody |
| 5,544,892 A | | 8/1996 | Breeding |
| 5,575,475 A | | 11/1996 | Steinbach |
| 5,584,483 A | | 12/1996 | Sines et al. |
| 5,586,766 A | | 12/1996 | Forte et al. |
| 5,586,936 A | | 12/1996 | Bennett et al. |
| 5,605,334 A | | 2/1997 | McCrea, Jr. |
| 5,613,912 A | | 3/1997 | Slater |
| 5,632,483 A | | 5/1997 | Garczynski et al. |
| 5,636,843 A | | 6/1997 | Roberts |
| 5,651,548 A | | 7/1997 | French et al. |
| 5,655,961 A | | 8/1997 | Acres et al. |
| 5,655,966 A | | 8/1997 | Werdin, Jr. et al. |
| 5,669,816 A | | 9/1997 | Garczynski et al. |
| 5,676,231 A | | 10/1997 | Legras et al. |
| 5,676,372 A | | 10/1997 | Sines et al. |
| 5,681,039 A | | 10/1997 | Miller |
| 5,683,085 A | | 11/1997 | Johnson et al. |
| 5,685,543 A | | 11/1997 | Garner |
| 5,690,324 A | | 11/1997 | Otomo et al. |
| 5,692,748 A | | 12/1997 | Frisco et al. |
| 5,695,189 A | | 12/1997 | Breeding et al. |
| 5,701,565 A | | 12/1997 | Morgan |
| 5,707,286 A | | 1/1998 | Carlson |
| 5,707,287 A | * | 1/1998 | McCrea, Jr. .............. A63F 1/12 273/292 |
| 5,711,525 A | | 1/1998 | Breeding |
| 5,718,427 A | | 2/1998 | Cranford et al. |
| 5,719,288 A | | 2/1998 | Sens et al. |
| 5,720,484 A | | 2/1998 | Hsu |
| 5,722,893 A | | 3/1998 | Hill et al. |
| 5,735,525 A | | 4/1998 | McCrea, Jr. |
| 5,735,724 A | | 4/1998 | Udagawa |
| 5,735,742 A | | 4/1998 | French |
| 5,743,798 A | | 4/1998 | Adams et al. |
| 5,768,382 A | | 6/1998 | Schneier et al. |
| 5,770,533 A | | 6/1998 | Franchi |
| 5,770,553 A | | 6/1998 | Kroner et al. |
| 5,772,505 A | | 6/1998 | Garczynski et al. |
| 5,779,546 A | | 7/1998 | Meissner et al. |
| 5,781,647 A | | 7/1998 | Fishbine et al. |
| 5,785,321 A | | 7/1998 | van Putten et al. |
| 5,788,574 A | | 8/1998 | Ornstein et al. |
| 5,791,988 A | | 8/1998 | Nomi |
| 5,802,560 A | | 9/1998 | Joseph et al. |
| 5,803,808 A | | 9/1998 | Strisower |
| 5,810,355 A | | 9/1998 | Trilli |
| 5,813,326 A | | 9/1998 | Salomon |
| 5,813,912 A | | 9/1998 | Shultz |
| 5,814,796 A | | 9/1998 | Benson |
| 5,836,775 A | | 11/1998 | Hiyama et al. |
| 5,839,730 A | | 11/1998 | Pike |
| 5,845,906 A | | 12/1998 | Wirth |
| 5,851,011 A | | 12/1998 | Lott |
| 5,867,586 A | | 2/1999 | Liang |
| 5,879,233 A | | 3/1999 | Stupero |
| 5,883,804 A | | 3/1999 | Christensen |
| 5,890,717 A | | 4/1999 | Rosewarne et al. |
| 5,892,210 A | | 4/1999 | Levasseur |
| 5,909,876 A | | 6/1999 | Brown |
| 5,911,626 A | | 6/1999 | McCrea, Jr. |
| 5,919,090 A | | 7/1999 | Mothwurf |
| D412,723 S | | 8/1999 | Hachuel et al. |
| 5,936,222 A | | 8/1999 | Korsunsky |
| 5,941,769 A | | 8/1999 | Order |
| 5,944,310 A | | 8/1999 | Johnson et al. |
| D414,527 S | | 9/1999 | Tedham |
| 5,957,776 A | | 9/1999 | Hoehne |
| 5,974,150 A | | 10/1999 | Kaish et al. |
| 5,989,122 A | | 11/1999 | Roblejo |
| 5,991,308 A | | 11/1999 | Fuhrmann et al. |
| 6,015,311 A | | 1/2000 | Benjamin et al. |
| 6,019,368 A | | 2/2000 | Sines et al. |
| 6,019,374 A | | 2/2000 | Breeding |
| 6,039,650 A | | 3/2000 | Hill |
| 6,050,569 A | | 4/2000 | Taylor |
| 6,053,695 A | | 4/2000 | Longoria et al. |
| 6,061,449 A | | 5/2000 | Candelore et al. |
| 6,068,258 A | | 5/2000 | Breeding et al. |
| 6,069,564 A | | 5/2000 | Hatano et al. |
| 6,071,190 A | | 6/2000 | Weiss et al. |
| 6,093,103 A | | 7/2000 | McCrea, Jr. |
| 6,113,101 A | | 9/2000 | Wirth |
| 6,117,012 A | | 9/2000 | McCrea, Jr. |
| D432,588 S | | 10/2000 | Tedham |
| 6,126,166 A | | 10/2000 | Lorson et al. |
| 6,131,817 A | | 10/2000 | Miller |
| 6,139,014 A | | 10/2000 | Breeding et al. |
| 6,149,154 A | | 11/2000 | Grauzer et al. |
| 6,154,131 A | | 11/2000 | Jones, II et al. |
| 6,165,069 A | | 12/2000 | Sines et al. |

(56) References Cited

U.S. PATENT DOCUMENTS 6,165,072 A 12/2000 Davis et al.
6,183,362 B1 2/2001 Boushy
6,186,895 B1 2/2001 Oliver
6,196,416 B1 3/2001 Seagle
6,200,218 B1 3/2001 Lindsay
6,210,274 B1 4/2001 Carlson
6,213,310 B1 4/2001 Wennersten et al.
6,217,447 B1 4/2001 Lofink et al.
6,234,900 B1 5/2001 Cumbers
6,236,223 B1 5/2001 Brady et al.
6,250,632 B1 6/2001 Albrecht
6,254,002 B1 7/2001 Litman
6,254,096 B1 7/2001 Grauzer et al.
6,254,484 B1 7/2001 McCrea, Jr.
6,257,981 B1 7/2001 Acres et al.
6,267,248 B1 7/2001 Johnson et al.
6,267,648 B1 7/2001 Katayama et al.
6,267,671 B1 7/2001 Hogan
6,270,404 B2 8/2001 Sines et al.
6,272,223 B1 8/2001 Carlson
6,293,546 B1 9/2001 Hessing et al.
6,293,864 B1 9/2001 Romero
6,299,167 B1 10/2001 Sines et al.
6,299,534 B1 10/2001 Breeding et al.
6,299,536 B1 10/2001 Hill
6,308,886 B1 10/2001 Benson et al.
6,313,871 B1 11/2001 Schubert
6,325,373 B1 12/2001 Breeding et al.
6,334,614 B1 1/2002 Breeding
6,341,778 B1 1/2002 Lee
6,342,830 B1 1/2002 Want et al.
6,346,044 B1 2/2002 McCrea, Jr.
6,361,044 B1 3/2002 Block
6,386,973 B1 5/2002 Yoseloff
6,402,142 B1 6/2002 Warren et al.
6,403,908 B2 6/2002 Stardust et al.
6,443,839 B2 9/2002 Stockdale et al.
6,446,864 B1 9/2002 Kim et al.
6,454,266 B1 9/2002 Breeding et al.
6,460,848 B1 10/2002 Soltys et al.
6,464,584 B2 10/2002 Oliver
6,490,277 B1 12/2002 Tzotzkov
6,508,709 B1 1/2003 Karmarkar
6,514,140 B1 2/2003 Starch
6,517,435 B2 2/2003 Soltys et al.
6,517,436 B2 2/2003 Soltys et al.
6,520,857 B2 2/2003 Soltys et al.
6,527,271 B2 3/2003 Soltys et al.
6,530,836 B2 3/2003 Soltys et al.
6,530,837 B2 3/2003 Soltys et al.
6,532,297 B1 3/2003 Lindquist
6,533,276 B2 3/2003 Soltys et al.
6,533,662 B2 3/2003 Soltys et al.
6,561,897 B1 5/2003 Bourbour et al.
6,568,678 B2 5/2003 Breeding et al.
6,579,180 B2 6/2003 Soltys et al.
6,579,181 B2 6/2003 Soltys et al.
6,581,747 B1 6/2003 Charlier et al.
6,582,301 B2 6/2003 Hill
6,582,302 B2 6/2003 Romero
6,585,586 B1 7/2003 Romero
6,585,588 B2 7/2003 Hard
6,585,856 B2 7/2003 Zwick et al.
6,588,750 B1 7/2003 Grauzer et al.
6,588,751 B1 7/2003 Grauzer et al.
6,595,857 B2 7/2003 Soltys et al.
6,609,710 B1 8/2003 Order
6,612,928 B1 9/2003 Bradford et al.
6,616,535 B1 9/2003 Nishizaki et al.
6,619,662 B2 9/2003 Miller
6,622,185 B1 9/2003 Johnson et al.
6,626,757 B2 9/2003 Oliveras
6,629,019 B2 9/2003 Legge et al.
6,629,591 B1 10/2003 Griswold et al.
6,629,889 B2 10/2003 Mothwurf
6,629,894 B1 10/2003 Purton
6,637,622 B1 10/2003 Robinson
6,638,161 B2 10/2003 Soltys et al.
6,645,068 B1 11/2003 Kelly et al.
6,645,077 B2 11/2003 Rowe
6,651,981 B2 11/2003 Grauzer et al.
6,651,982 B2 11/2003 Grauzer et al.
6,651,985 B2 11/2003 Sines et al.
6,652,379 B2 11/2003 Soltys et al.
6,655,684 B2 12/2003 Grauzer et al.
6,655,690 B1 12/2003 Oskwarek
6,658,135 B1 12/2003 Morito et al.
6,659,460 B2 12/2003 Blaha et al.
6,659,461 B2 12/2003 Yoseloff
6,659,875 B2 12/2003 Purton
6,663,490 B2 12/2003 Soltys et al.
6,666,768 B1 12/2003 Akers
6,671,358 B1 12/2003 Seidman et al.
6,676,127 B2 1/2004 Johnson et al.
6,676,517 B2 1/2004 Beavers
6,680,843 B2 1/2004 Farrow et al.
6,685,564 B2 2/2004 Oliver
6,685,567 B2 2/2004 Cockerille et al.
6,685,568 B2 2/2004 Soltys et al.
6,688,597 B2 2/2004 Jones
6,688,979 B2 2/2004 Soltys et al.
6,690,673 B1 2/2004 Jarvis
6,698,756 B1 3/2004 Baker et al.
6,698,759 B2 3/2004 Webb et al.
6,702,289 B1 3/2004 Feola
6,702,290 B2 3/2004 Buono-Correa et al.
6,709,333 B1 3/2004 Bradford et al.
6,712,696 B2 3/2004 Soltys et al.
6,719,288 B2 4/2004 Hessing et al.
6,719,634 B2 4/2004 Mishina et al.
6,722,974 B2 4/2004 Sines
6,726,205 B1 4/2004 Purton
6,732,067 B1 5/2004 Powderly
6,733,012 B2 5/2004 Bui et al.
6,733,388 B2 5/2004 Mothwurf
6,746,333 B1 6/2004 Onda et al.
6,747,560 B2 6/2004 Stevens, III
6,749,510 B2 6/2004 Giobbi
6,758,751 B2 7/2004 Soltys et al.
6,758,757 B2 7/2004 Luciano, Jr. et al.
6,769,693 B2 8/2004 Huard et al.
6,774,782 B2 8/2004 Runyon et al.
6,789,801 B2 9/2004 Snow
6,802,510 B1 10/2004 Haber
6,804,763 B1 10/2004 Stockdale et al.
6,808,173 B2 10/2004 Snow
6,827,282 B2 12/2004 Silverbrook
6,834,251 B1 12/2004 Fletcher
6,840,517 B2 1/2005 Snow et al.
6,842,263 B1 1/2005 Saeki
6,843,725 B2 1/2005 Nelson
6,848,616 B2 2/2005 Tsirline et al.
6,848,844 B2 2/2005 McCue, Jr. et al.
6,848,994 B1 2/2005 Knust et al.
6,857,961 B2 2/2005 Soltys et al.
6,874,784 B1 4/2005 Promutico et al.
6,874,786 B2 4/2005 Bruno
6,877,657 B2 4/2005 Ranard
6,877,748 B1 4/2005 Patroni et al.
6,886,829 B2 5/2005 Hessing et al.
6,889,979 B2 5/2005 Blaha et al.
6,893,347 B1 5/2005 Zilliacus et al.
6,899,628 B2 5/2005 Leen et al.
6,902,167 B2 6/2005 Webb
6,905,121 B1 6/2005 Timpano
6,923,446 B2 8/2005 Snow
6,938,900 B2 9/2005 Snow
6,941,180 B1 9/2005 Fisher et al.
6,950,948 B2 9/2005 Neff
6,955,599 B2 10/2005 Bourbour et al.
6,957,746 B2 10/2005 Martin et al.
6,959,925 B1 11/2005 Baker et al.
6,960,134 B2 11/2005 Hartl et al.
6,964,612 B2 11/2005 Soltys et al.

(56) References Cited

U.S. PATENT DOCUMENTS 6,986,514 B2 1/2006 Snow
6,988,516 B2 1/2006 Debaes
7,011,309 B2 3/2006 Soltys et al.
7,020,307 B2 3/2006 Hinton et al.
7,028,598 B2 4/2006 Teshima
7,029,009 B2 4/2006 Grauzer et al.
7,036,818 B2 5/2006 Grauzer et al.
7,046,458 B2 5/2006 Nakayama
7,046,764 B1 5/2006 Kump
7,048,629 B2 5/2006 Sines et al.
7,059,602 B2 6/2006 Grauzer et al.
7,066,464 B2 6/2006 Blad et al.
7,068,822 B2 6/2006 Scott
7,073,791 B2 7/2006 Grauzer et al.
7,079,010 B2 7/2006 Champlin
7,084,769 B2 8/2006 Bauer et al.
7,089,420 B1 8/2006 Durst et al.
D527,900 S 9/2006 Dewa
7,106,201 B2 9/2006 Tuttle
7,113,094 B2 9/2006 Garber et al.
7,114,718 B2 10/2006 Grauzer et al.
7,124,947 B2 10/2006 Storch
7,128,652 B1 10/2006 Lavoie et al.
7,137,627 B2 11/2006 Grauzer et al.
7,139,108 B2 11/2006 Andersen et al.
7,140,614 B2 11/2006 Snow
7,162,035 B1 1/2007 Durst et al.
7,165,769 B2 1/2007 Crenshaw et al.
7,165,770 B2 1/2007 Snow
7,175,522 B2 2/2007 Hartl
7,186,181 B2 3/2007 Rowe
7,201,656 B2 4/2007 Darder
7,202,888 B2 4/2007 Tecu et al.
7,203,841 B2 4/2007 Jackson et al.
7,213,812 B2 5/2007 Schubert
7,222,852 B2 5/2007 Soltys
7,222,855 B2 5/2007 Sorge
7,231,812 B1 6/2007 Lagare
7,234,698 B2 6/2007 Grauzer et al.
7,237,969 B2 7/2007 Bartman
7,243,148 B2 7/2007 Keir et al.
7,243,698 B2 7/2007 Siegel
7,246,799 B2 7/2007 Snow
7,255,344 B2 8/2007 Grauzer et al.
7,255,351 B2 8/2007 Yoseloff et al.
7,255,642 B2 8/2007 Sines et al.
7,257,630 B2 8/2007 Cole et al.
7,261,294 B2 8/2007 Grauzer et al.
7,264,241 B2 9/2007 Schubert et al.
7,264,243 B2 9/2007 Yoseloff et al.
7,277,570 B2 10/2007 Armstrong
7,278,923 B2 10/2007 Grauzer et al.
7,294,056 B2 11/2007 Lowell et al.
7,297,062 B2 11/2007 Gatto et al.
7,300,056 B2 11/2007 Gioia et al.
7,303,473 B2 12/2007 Rowe
7,303,475 B2 12/2007 Britt et al.
7,309,065 B2 12/2007 Yoseloff et al.
7,316,609 B2 1/2008 Dunn et al.
7,316,615 B2 1/2008 Soltys et al.
7,322,576 B2 1/2008 Grauzer et al.
7,331,579 B2 2/2008 Snow
7,334,794 B2 2/2008 Snow
7,338,044 B2 3/2008 Grauzer et al.
7,338,362 B1 3/2008 Gallagher
7,341,510 B2 3/2008 Bourbour et al.
D566,784 S 4/2008 Palmer
7,357,321 B2 4/2008 Yoshida
7,360,094 B2 4/2008 Neff
7,367,561 B2 5/2008 Blaha et al.
7,367,563 B2 5/2008 Yoseloff et al.
7,367,565 B2 5/2008 Chiu
7,367,884 B2 5/2008 Breeding et al.
7,374,170 B2 5/2008 Grauzer et al.
7,384,044 B2 6/2008 Grauzer et al.
7,387,300 B2 6/2008 Snow
7,389,990 B2 6/2008 Mourad
7,390,256 B2 6/2008 Soltys et al.
7,399,226 B2 7/2008 Mishra
7,407,438 B2 8/2008 Schubert et al.
7,413,191 B2 8/2008 Grauzer et al.
7,434,805 B2 10/2008 Grauzer et al.
7,436,957 B1 10/2008 Fisher et al.
7,448,626 B2 11/2008 Fleckenstein
7,458,582 B2 12/2008 Snow et al.
7,461,843 B1 12/2008 Baker et al.
7,464,932 B2 12/2008 Darling
7,464,934 B2 12/2008 Schwartz
7,472,906 B2 1/2009 Shai
7,478,813 B1 1/2009 Hofferber et al.
7,500,672 B2 3/2009 Ho
7,506,874 B2 3/2009 Hall
7,510,186 B2 3/2009 Fleckenstein
7,510,190 B2 3/2009 Snow et al.
7,510,194 B2 3/2009 Soltys et al.
7,510,478 B2 3/2009 Benbrahim et al.
7,513,437 B2 4/2009 Douglas
7,515,718 B2 4/2009 Nguyen et al.
7,523,935 B2 4/2009 Grauzer et al.
7,523,936 B2 4/2009 Grauzer et al.
7,523,937 B2 4/2009 Fleckenstein
7,525,510 B2 4/2009 Beland et al.
7,537,216 B2 5/2009 Soltys et al.
7,540,497 B2 6/2009 Tseng
7,540,498 B2 6/2009 Crenshaw et al.
7,549,643 B2 6/2009 Quach
7,554,753 B2 6/2009 Wakamiya
7,556,197 B2 7/2009 Yoshida
7,556,266 B2 7/2009 Blaha et al.
7,575,237 B2 8/2009 Snow
7,578,506 B2 8/2009 Lambert
7,584,962 B2 9/2009 Breeding et al.
7,584,963 B2 9/2009 Krenn et al.
7,584,966 B2 9/2009 Snow
7,591,728 B2 9/2009 Gioia et al.
7,593,544 B2 9/2009 Downs
7,594,660 B2 9/2009 Baker et al.
7,597,623 B2 10/2009 Grauzer et al.
7,644,923 B1 1/2010 Dickinson et al.
7,661,676 B2 2/2010 Smith et al.
7,666,090 B2 2/2010 Hettinger
7,669,852 B2 3/2010 Baker et al.
7,669,853 B2 3/2010 Jones
7,677,565 B2 3/2010 Grauzer et al.
7,677,566 B2 3/2010 Krenn et al.
7,686,681 B2 3/2010 Soltys et al.
7,699,694 B2 4/2010 Hill
7,735,657 B2 6/2010 Johnson
7,740,244 B2 6/2010 Ho
7,744,452 B2 6/2010 Cimring et al.
7,753,373 B2 7/2010 Grauzer et al.
7,753,374 B2 7/2010 Ho
7,753,798 B2 7/2010 Soltys
7,758,425 B2 7/2010 Poh et al.
7,762,554 B2 7/2010 Ho
7,764,836 B2 7/2010 Downs et al.
7,766,332 B2 8/2010 Grauzer et al.
7,766,333 B1 8/2010 Stardust
7,769,232 B2 8/2010 Downs, III
7,769,853 B2 8/2010 Nezamzadeh
7,773,749 B1 8/2010 Durst et al.
7,780,529 B2 8/2010 Rowe et al.
7,784,790 B2 8/2010 Grauzer et al.
7,804,982 B2 9/2010 Howard et al.
7,824,255 B2 11/2010 Lutnick
7,846,020 B2 12/2010 Walker et al.
7,867,080 B2 1/2011 Nicely et al.
7,890,365 B2 2/2011 Hettinger
7,900,923 B2 3/2011 Toyama et al.
7,901,285 B2 3/2011 Tran et al.
7,908,169 B2 3/2011 Hettinger
7,909,689 B2 3/2011 Lardie
7,931,533 B2 4/2011 LeMay et al.
7,933,448 B2 4/2011 Downs, III

(56) References Cited

U.S. PATENT DOCUMENTS 7,946,586 B2 5/2011 Krenn et al.
7,967,294 B2 6/2011 Blaha et al.
7,976,023 B1 7/2011 Hessing et al.
7,988,152 B2 8/2011 Sines et al.
7,988,554 B2 8/2011 LeMay et al.
7,995,196 B1 8/2011 Fraser
8,002,638 B2 8/2011 Grauzer et al.
8,011,661 B2 9/2011 Stasson
8,016,663 B2 9/2011 Soltys et al.
8,021,231 B2 9/2011 Walker et al.
8,025,294 B2 9/2011 Grauzer et al.
8,038,521 B2 10/2011 Grauzer et al.
RE42,944 E 11/2011 Blaha et al.
8,057,302 B2 11/2011 Wells et al.
8,062,134 B2 11/2011 Kelly et al.
8,070,574 B2 12/2011 Grauzer et al.
8,092,307 B2 1/2012 Kelly
8,092,309 B2 1/2012 Bickley
8,109,514 B2 2/2012 Toyama
8,141,875 B2 3/2012 Grauzer et al.
8,150,158 B2 4/2012 Downs, III
8,171,567 B1 5/2012 Fraser et al.
8,210,536 B2 7/2012 Blaha et al.
8,221,244 B2 7/2012 French
8,251,293 B2 8/2012 Nagata et al.
8,267,404 B2 9/2012 Grauzer et al.
8,270,603 B1 9/2012 Durst et al.
8,287,347 B2 10/2012 Snow et al.
8,287,386 B2 10/2012 Miller et al.
8,319,666 B2 11/2012 Weinmann et al.
8,337,296 B2 12/2012 Grauzer et al.
8,342,525 B2 1/2013 Scheper et al.
8,342,526 B1 1/2013 Sampson
8,342,529 B2 1/2013 Snow
8,353,513 B2 1/2013 Swanson
8,381,918 B2 2/2013 Johnson
8,419,521 B2 4/2013 Grauzer et al.
8,429,229 B2 4/2013 Sepich et al.
8,444,147 B2 5/2013 Grauzer et al.
8,444,489 B2 5/2013 Lian et al.
8,469,360 B2 6/2013 Sines
8,475,252 B2 7/2013 Savage et al.
8,480,088 B2 7/2013 Toyama et al.
8,485,527 B2 7/2013 Sampson et al.
8,490,973 B2 7/2013 Yoseloff et al.
8,498,444 B2 7/2013 Sharma
8,505,916 B2 8/2013 Grauzer et al.
8,511,684 B2 8/2013 Grauzer et al.
8,512,146 B2 8/2013 Gururajan et al.
8,550,464 B2 10/2013 Soltys et al.
8,556,263 B2 10/2013 Grauzer et al.
8,579,289 B2 11/2013 Rynda et al.
8,602,416 B2 12/2013 Toyama
8,616,552 B2 12/2013 Czyzewski et al.
8,628,086 B2 1/2014 Krenn et al.
8,651,485 B2 2/2014 Stasson
8,662,500 B2 3/2014 Swanson
8,695,978 B1 4/2014 Ho
8,702,100 B2 4/2014 Snow et al.
8,702,101 B2 4/2014 Scheper et al.
8,720,891 B2 5/2014 Hessing et al.
8,758,111 B2 6/2014 Lutnick
8,777,710 B2 7/2014 Grauzer et al.
8,820,745 B2 9/2014 Grauzer et al.
8,844,930 B2 9/2014 Sampson
8,899,587 B2 12/2014 Grauzer et al.
8,919,775 B2 12/2014 Wadds et al.
9,101,821 B2 8/2015 Snow
9,251,661 B2 2/2016 Tammesoo
9,266,012 B2 2/2016 Grauzer
9,280,866 B2 3/2016 Nayak et al.
9,378,766 B2 6/2016 Kelly et al.
9,474,957 B2 10/2016 Haushalter et al.
9,504,905 B2 11/2016 Kelly et al.
9,511,274 B2 12/2016 Kelly et al.
9,566,501 B2 2/2017 Stasson et al.
9,679,603 B2 6/2017 Kelly et al.
9,731,190 B2 8/2017 Sampson et al.
2001/0036231 A1 11/2001 Easwar et al.
2001/0036866 A1 11/2001 Stockdale et al.
2002/0017481 A1 2/2002 Johnson et al.
2002/0042299 A1* 4/2002 Soltys ................ G06Q 10/0639
463/29
2002/0045478 A1 4/2002 Soltys et al.
2002/0045481 A1 4/2002 Soltys et al.
2002/0063389 A1 5/2002 Breeding et al.
2002/0068635 A1 6/2002 Hill
2002/0070499 A1 6/2002 Breeding et al.
2002/0094869 A1 7/2002 Harkham
2002/0107067 A1 8/2002 McGlone et al.
2002/0107072 A1 8/2002 Giobbi
2002/0113368 A1 8/2002 Hessing et al.
2002/0135692 A1 9/2002 Fujinawa
2002/0142820 A1 10/2002 Bartlett
2002/0155869 A1 10/2002 Soltys et al.
2002/0163122 A1 11/2002 Vancura
2002/0163125 A1 11/2002 Grauzer et al.
2002/0187821 A1 12/2002 Soltys et al.
2002/0187830 A1 12/2002 Stockdale et al.
2003/0003997 A1 1/2003 Vuong et al.
2003/0007143 A1 1/2003 McArthur et al.
2003/0042673 A1 3/2003 Grauzer
2003/0047870 A1 3/2003 Blaha et al.
2003/0048476 A1 3/2003 Yamakawa
2003/0052449 A1 3/2003 Grauzer et al.
2003/0052450 A1 3/2003 Grauzer et al.
2003/0064798 A1 4/2003 Grauzer et al.
2003/0067112 A1 4/2003 Grauzer et al.
2003/0071413 A1 4/2003 Blaha et al.
2003/0073498 A1 4/2003 Grauzer et al.
2003/0075865 A1 4/2003 Grauzer et al.
2003/0075866 A1 4/2003 Blaha et al.
2003/0087694 A1 5/2003 Storch
2003/0090059 A1 5/2003 Grauzer et al.
2003/0094756 A1 5/2003 Grauzer et al.
2003/0151194 A1 8/2003 Hessing et al.
2003/0195025 A1 10/2003 Hill
2004/0015423 A1 1/2004 Walker et al.
2004/0036214 A1 2/2004 Baker et al.
2004/0067789 A1 4/2004 Grauzer et al.
2004/0100026 A1 5/2004 Haggard
2004/0108654 A1 6/2004 Grauzer et al.
2004/0116179 A1 6/2004 Nicely et al.
2004/0169332 A1 9/2004 Grauzer et al.
2004/0180722 A1 9/2004 Giobbi
2004/0224777 A1 11/2004 Smith et al.
2004/0245720 A1 12/2004 Grauzer et al.
2004/0259618 A1 12/2004 Soltys et al.
2005/0012671 A1 1/2005 Bisig
2005/0012818 A1* 1/2005 Kiely ...................... G07F 19/20
348/143
2005/0023752 A1 2/2005 Grauzer et al.
2005/0026680 A1 2/2005 Gururajan
2005/0035548 A1 2/2005 Yoseloff
2005/0037843 A1 2/2005 Wells et al.
2005/0040594 A1 2/2005 Krenn et al.
2005/0051955 A1 3/2005 Schubert et al.
2005/0051956 A1 3/2005 Grauzer et al.
2005/0062227 A1 3/2005 Grauzer et al.
2005/0062228 A1 3/2005 Grauzer et al.
2005/0062229 A1 3/2005 Grauzer et al.
2005/0082750 A1 4/2005 Grauzer et al.
2005/0093231 A1 5/2005 Grauzer et al.
2005/0104289 A1 5/2005 Grauzer et al.
2005/0104290 A1 5/2005 Grauzer et al.
2005/0110210 A1 5/2005 Soltys et al.
2005/0113166 A1 5/2005 Grauzer et al.
2005/0113171 A1 5/2005 Hodgson
2005/0119048 A1 6/2005 Soltys
2005/0121852 A1 6/2005 Soltys et al.
2005/0137005 A1 6/2005 Soltys et al.
2005/0140090 A1 6/2005 Breeding et al.
2005/0146093 A1 7/2005 Grauzer et al.
2005/0148391 A1 7/2005 Tain

(56) References Cited

U.S. PATENT DOCUMENTS

2005/0164759 A1 7/2005 Smith et al.
2005/0164761 A1 7/2005 Tain
2005/0192092 A1 9/2005 Breckner et al.
2005/0206077 A1 9/2005 Grauzer et al.
2005/0242500 A1 11/2005 Downs
2005/0272501 A1 12/2005 Tran et al.
2005/0277463 A1* 12/2005 Knust .................... G07F 17/32 463/29
2005/0288083 A1 12/2005 Downs
2005/0288086 A1 12/2005 Schubert et al.
2006/0027970 A1 2/2006 Kyrychenko
2006/0033269 A1 2/2006 Grauzer et al.
2006/0033270 A1 2/2006 Grauzer et al.
2006/0046853 A1 3/2006 Black
2006/0063577 A1 3/2006 Downs, III et al.
2006/0066048 A1 3/2006 Krenn et al.
2006/0084502 A1 4/2006 Downs et al.
2006/0151946 A1 7/2006 Ngai
2006/0181022 A1 8/2006 Grauzer et al.
2006/0183540 A1 8/2006 Grauzer et al.
2006/0189381 A1 8/2006 Daniel et al.
2006/0199649 A1 9/2006 Soltys et al.
2006/0205508 A1 9/2006 Green
2006/0220312 A1 10/2006 Baker et al.
2006/0220313 A1 10/2006 Baker et al.
2006/0252521 A1 11/2006 Gururajan et al.
2006/0252554 A1 11/2006 Gururajan et al.
2006/0279040 A1 12/2006 Downs et al.
2006/0281534 A1 12/2006 Grauzer et al.
2007/0001395 A1 1/2007 Gioia et al.
2007/0006708 A1 1/2007 Laakso
2007/0015583 A1 1/2007 Tran
2007/0018389 A1 1/2007 Downs, III
2007/0045959 A1 3/2007 Soltys
2007/0049368 A1 3/2007 Kuhn et al.
2007/0057469 A1 3/2007 Grauzer et al.
2007/0066387 A1 3/2007 Matsuno et al.
2007/0069462 A1 3/2007 Downs, III et al.
2007/0072677 A1 3/2007 Lavoie et al.
2007/0102879 A1 5/2007 Stasson
2007/0111773 A1 5/2007 Gururajan et al.
2007/0184905 A1 8/2007 Gatto et al.
2007/0197294 A1 8/2007 Gong
2007/0197298 A1 8/2007 Rowe
2007/0202941 A1 8/2007 Miltenberger et al.
2007/0222147 A1 9/2007 Blaha et al.
2007/0225055 A1 9/2007 Weisman
2007/0233567 A1 10/2007 Daly
2007/0238506 A1 10/2007 Ruckle
2007/0241498 A1 10/2007 Soltys
2007/0259709 A1 11/2007 Kelly et al.
2007/0267812 A1 11/2007 Grauzer et al.
2007/0272600 A1 11/2007 Johnson
2007/0278739 A1 12/2007 Swanson
2007/0287534 A1 12/2007 Fleckenstein
2007/0290438 A1 12/2007 Grauzer et al.
2008/0004107 A1* 1/2008 Nguyen ................. G06Q 10/10 463/29
2008/0006997 A1 1/2008 Scheper et al.
2008/0006998 A1 1/2008 Grauzer et al.
2008/0022415 A1 1/2008 Kuo et al.
2008/0032763 A1 2/2008 Giobbi
2008/0039192 A1 2/2008 Laut
2008/0039208 A1 2/2008 Abrink et al.
2008/0096656 A1 4/2008 LeMay et al.
2008/0111300 A1 5/2008 Czyzewski et al.
2008/0113700 A1 5/2008 Czyzewski et al.
2008/0136108 A1 6/2008 Polay
2008/0143048 A1 6/2008 Shigeta
2008/0176627 A1 7/2008 Lardie
2008/0217218 A1 9/2008 Johnson
2008/0234046 A1 9/2008 Kinsley
2008/0234047 A1 9/2008 Nguyen
2008/0248875 A1 10/2008 Beatty
2008/0284096 A1 11/2008 Toyama et al.
2008/0303210 A1 12/2008 Grauzer et al.
2008/0315517 A1 12/2008 Toyama et al.
2009/0026700 A2 1/2009 Shigeta
2009/0048026 A1 2/2009 French
2009/0054161 A1 2/2009 Schuber et al.
2009/0072477 A1 3/2009 Tseng et al.
2009/0121429 A1 3/2009 Walsh et al.
2009/0091078 A1 4/2009 Grauzer et al.
2009/0100409 A1 4/2009 Toneguzzo
2009/0104963 A1 4/2009 Burman
2009/0134575 A1* 5/2009 Dickinson .............. A63F 1/062 273/149 R
2009/0140492 A1 6/2009 Yoseloff et al.
2009/0166970 A1 7/2009 Rosh et al.
2009/0176547 A1 7/2009 Katz
2009/0179378 A1 7/2009 Amaitis et al.
2009/0186676 A1 7/2009 Amaitis et al.
2009/0189346 A1 7/2009 Krenn et al.
2009/0191933 A1 7/2009 French
2009/0194988 A1 8/2009 Wright et al.
2009/0197662 A1 8/2009 Wright et al.
2009/0224476 A1 9/2009 Grauzer et al.
2009/0227318 A1 9/2009 Wright et al.
2009/0227360 A1 9/2009 Gioia et al.
2009/0250873 A1 10/2009 Jones
2009/0253478 A1 10/2009 Walker et al.
2009/0253503 A1 10/2009 Krise et al.
2009/0267296 A1 10/2009 Ho et al.
2009/0267297 A1 10/2009 Blaha et al.
2009/0283969 A1 11/2009 Tseng et al.
2009/0298577 A1 12/2009 Gagner et al.
2009/0302535 A1 12/2009 Ho et al.
2009/0302537 A1 12/2009 Ho et al.
2009/0312093 A1 12/2009 Walker et al.
2009/0314188 A1 12/2009 Toyama et al.
2010/0013152 A1 1/2010 Grauzer
2010/0038849 A1 2/2010 Scheper et al.
2010/0048304 A1 2/2010 Boesen
2010/0069155 A1 3/2010 Schwartz et al.
2010/0178987 A1 7/2010 Pacey
2010/0197410 A1 8/2010 Leen et al.
2010/0234110 A1 9/2010 Clarkson
2010/0240440 A1 9/2010 Szrek et al.
2010/0244376 A1 9/2010 Johnson
2010/0244382 A1 9/2010 Snow
2010/0252992 A1 10/2010 Sines
2010/0255899 A1 10/2010 Paulsen
2010/0276880 A1 11/2010 Grauzer et al.
2010/0311493 A1 12/2010 Miller et al.
2010/0311494 A1 12/2010 Miller et al.
2010/0314830 A1 12/2010 Grauzer et al.
2010/0320685 A1 12/2010 Grauzer
2011/0006480 A1 1/2011 Grauzer
2011/0012303 A1 1/2011 Kourgiantakis et al.
2011/0024981 A1 2/2011 Tseng
2011/0052049 A1 3/2011 Rajaraman et al.
2011/0062662 A1 3/2011 Ohta
2011/0078096 A1 3/2011 Bounds
2011/0079959 A1 4/2011 Hartley
2011/0105208 A1 5/2011 Bickley
2011/0109042 A1 5/2011 Rynda
2011/0130185 A1 6/2011 Walker
2011/0130190 A1 6/2011 Hamman et al.
2011/0159952 A1 6/2011 Kerr
2011/0159953 A1 6/2011 Kerr
2011/0165936 A1 7/2011 Kerr
2011/0172008 A1 7/2011 Alderucci
2011/0183748 A1 7/2011 Wilson et al.
2011/0230148 A1 9/2011 Demuynck et al.
2011/0230268 A1 9/2011 Williams
2011/0269529 A1 11/2011 Baerlocher
2011/0272881 A1 11/2011 Sines
2011/0285081 A1 11/2011 Stasson
2011/0287829 A1 11/2011 Clarkson et al.
2012/0015724 A1 1/2012 Ocko et al.
2012/0015725 A1 1/2012 Ocko et al.
2012/0015743 A1 1/2012 Lam et al.
2012/0015747 A1 1/2012 Ocko et al.
2012/0021835 A1 1/2012 Keller et al.

(56) References Cited

U.S. PATENT DOCUMENTS

| | | | |
|---|---|---|---|
| 2012/0034977 A1 | 2/2012 | Kammler | |
| 2012/0062745 A1 | 3/2012 | Han et al. | |
| 2012/0074646 A1 | 3/2012 | Grauzer et al. | |
| 2012/0091656 A1 | 4/2012 | Blaha et al. | |
| 2012/0095982 A1 | 4/2012 | Lennington et al. | |
| 2012/0161393 A1 | 6/2012 | Krenn et al. | |
| 2012/0175841 A1 | 7/2012 | Grauzer | |
| 2012/0181747 A1 | 7/2012 | Grauzer et al. | |
| 2012/0187625 A1 | 7/2012 | Downs, III et al. | |
| 2012/0242782 A1 | 9/2012 | Huang | |
| 2012/0286471 A1 | 11/2012 | Grauzer et al. | |
| 2012/0306152 A1 | 12/2012 | Krishnamurty et al. | |
| 2013/0020761 A1 | 1/2013 | Sines et al. | |
| 2013/0023318 A1 | 1/2013 | Abrahamson | |
| 2013/0085638 A1 | 4/2013 | Weinmann et al. | |
| 2013/0099448 A1 | 4/2013 | Scheper et al. | |
| 2013/0109455 A1 | 5/2013 | Grauzer et al. | |
| 2013/0132306 A1 | 5/2013 | Kami et al. | |
| 2013/0147116 A1 | 6/2013 | Stasson | |
| 2013/0161905 A1 | 6/2013 | Grauzer et al. | |
| 2013/0228972 A1 | 9/2013 | Grauzer et al. | |
| 2013/0241147 A1 | 9/2013 | McGrath | |
| 2013/0300059 A1 | 11/2013 | Sampson et al. | |
| 2013/0337922 A1 | 12/2013 | Kuhn | |
| 2014/0027979 A1 | 1/2014 | Stasson et al. | |
| 2014/0094239 A1 | 4/2014 | Grauzer et al. | |
| 2014/0103606 A1 | 4/2014 | Grauzer et al. | |
| 2014/0138907 A1 | 5/2014 | Rynda et al. | |
| 2014/0145399 A1 | 5/2014 | Krenn et al. | |
| 2014/0171170 A1 | 6/2014 | Krishnamurty et al. | |
| 2014/0175724 A1 | 6/2014 | Huhtala et al. | |
| 2014/0183818 A1 | 7/2014 | Czyzewski et al. | |
| 2015/0021242 A1 | 1/2015 | Johnson | |
| 2015/0069699 A1 | 3/2015 | Blazevic | |
| 2015/0196834 A1 | 7/2015 | Snow | |
| 2015/0238848 A1 | 8/2015 | Kuhn et al. | |
| 2017/0157499 A1 | 6/2017 | Krenn et al. | |

FOREIGN PATENT DOCUMENTS

| | | | |
|---|---|---|---|
| AU | 697805 | B2 | 10/1988 |
| AU | 757636 | B2 | 2/2003 |
| CA | 2266555 | A1 | 9/1996 |
| CA | 2284017 | A1 | 9/1998 |
| CA | 2612138 | A1 | 12/2006 |
| CN | 2051521 | U | 1/1990 |
| CN | 1383099 | A | 12/2002 |
| CN | 1824356 | A | 8/2006 |
| CN | 2848303 | Y | 12/2006 |
| CN | 2855481 | Y | 1/2007 |
| CN | 1933881 | A | 3/2007 |
| CN | 2877425 | Y | 3/2007 |
| CN | 101025603 | A | 8/2007 |
| CN | 200954370 | Y | 10/2007 |
| CN | 200987893 | Y | 12/2007 |
| CN | 101099896 | A | 1/2008 |
| CN | 101127131 | A | 2/2008 |
| CN | 101134141 | A | 3/2008 |
| CN | 201085907 | Y | 7/2008 |
| CN | 201132058 | Y | 10/2008 |
| CN | 201139926 | Y | 10/2008 |
| CN | 100571826 | C | 12/2009 |
| CN | 1771077 | B | 6/2010 |
| CN | 102125756 | A | 7/2011 |
| CN | 102170944 | A | 8/2011 |
| CN | 101783011 | B | 12/2011 |
| CN | 102847311 | A | 1/2013 |
| CN | 202983149 | U | 6/2013 |
| CZ | 24952 | U1 | 2/2013 |
| DE | 3807127 | A1 | 9/1989 |
| DE | 2757341 | A1 | 9/1998 |
| EP | 177514 | B1 | 2/2000 |
| EP | 1502631 | A1 | 2/2005 |
| EP | 1713026 | A1 | 10/2006 |
| EP | 1194888 | A1 | 8/2009 |
| EP | 2228106 | A1 | 9/2010 |
| EP | 1575261 | B1 | 8/2012 |
| FR | 2375918 | A1 | 7/1978 |
| GB | 289552 | A | 4/1928 |
| GB | 337147 | A | 9/1929 |
| GB | 414014 | A | 7/1934 |
| GB | 672616 | A | 5/1952 |
| JP | 10063933 | A | 3/1998 |
| JP | 11045321 | A | 2/1999 |
| JP | 2000251031 | A | 9/2000 |
| JP | 2001327647 | A | 11/2001 |
| JP | 2002165916 | A | 6/2002 |
| JP | 2003-154320 | A | 5/2003 |
| JP | 2003250950 | A | 9/2003 |
| JP | 2005198668 | A | 7/2005 |
| JP | 2008246061 | A | 10/2008 |
| JP | 4586474 | B2 | 11/2010 |
| TW | M335308 | U | 7/2008 |
| TW | M357307 | U | 5/2009 |
| TW | M1359356 | U | 6/2009 |
| TW | I345476 | B | 7/2011 |
| WO | 8700764 | A1 | 2/1987 |
| WO | 9221413 | A1 | 12/1992 |
| WO | 9528210 | A1 | 10/1995 |
| WO | 9607153 | A1 | 3/1996 |
| WO | 9710577 | A1 | 3/1997 |
| WO | 9814249 | A1 | 4/1998 |
| WO | 9840136 | A1 | 9/1998 |
| WO | 9943404 | A1 | 9/1999 |
| WO | 9952610 | A1 | 10/1999 |
| WO | 9952611 | A1 | 10/1999 |
| WO | 200051076 | A1 | 8/2000 |
| WO | 156670 | A1 | 8/2001 |
| WO | 178854 | A3 | 10/2001 |
| WO | 205914 | A1 | 1/2002 |
| WO | 3026763 | A1 | 4/2003 |
| WO | 2004067889 | A1 | 12/2004 |
| WO | 2004112923 | A1 | 12/2004 |
| WO | 2006031472 | A2 | 3/2006 |
| WO | 2006039308 | A2 | 4/2006 |
| WO | 2008005286 | A2 | 1/2008 |
| WO | 2008006023 | A2 | 1/2008 |
| WO | 2008091809 | A2 | 7/2008 |
| WO | 2009067758 | A1 | 6/2009 |
| WO | 2009137541 | A2 | 11/2009 |
| WO | 2010001032 | A2 | 1/2010 |
| WO | 2010052573 | A2 | 5/2010 |
| WO | 2010055328 | A2 | 5/2010 |
| WO | 2010117446 | A2 | 10/2010 |
| WO | 2012/053074 | A1 | 4/2012 |
| WO | 2013019677 | A2 | 2/2013 |
| WO | 2016058085 | A9 | 4/2016 |

OTHER PUBLICATIONS

"ACE, Single Deck Shuffler," Shuffle Master, Inc., (2005), 2 pages.
Advansys, "Player Tracking" http://advansys.si/products/tablescanner/player-tracking/[Sep. 23, 2016 1:41:34 PM], 4 pages.
Australian Examination Report for Australian Application No. 2008202752, dated Sep. 25, 2009, 2 pages.
Australian Examination Report for Australian Application No. 2010202856, dated Aug. 11, 2011, 2 pages.
Australian Provisional Patent Application for Australian Patent Application No. PM7441, filed Aug. 15, 1994, Applicants: Rodney G. Johnson et al., Title: Card Handling Apparatus, 13 pages.
"Automatic casino card shuffle," Alibaba.com, (last visited Jul. 22, 2014), 2 pages.
Bally Systems Catalogue, Ballytech.com/systems, 2012, 13 pages.
Canadian Office Action for CA 2,580,309 dated Mar. 20, 2012 (6 pages).
Canadian Office Action for Canadian Application No. 2,461,726, dated Jul. 19, 2010, 3 pages.
Canadian Office Action for Canadian Application No. 2,461,726, dated Dec. 11, 2013, 3 pages.
Christos Stergiou and Dimitrios Siganos, "Neural Networks," http://www.doc.ic.ac.uk/~nd/surprise_96/journal/vol4/cs11/report.html (13 pages), Dec. 15, 2011.

(56) References Cited

OTHER PUBLICATIONS

Complaint filed in the matter of *SHFL entertainment, In.* v. *DigiDeal Corporation*, U.S. District Court, District of Nevada, U.S. Civil Action No. CV 2:12-cv-01782-GMC-VCF, Oct. 10, 2012, 62 pages.
Documents submitted in the case of *Shuffle Master, Inc.* v. *Card Aurstia, et al.*, Case No. CV-N-0508-HDM-(VPC) Consolidated with Case No. CV-N-02-0244-ERC-(RAM)), May 6, 2003, scan of color pages, for clarity, Part 18 of 23 (color copies from Binder 1).
Documents submitted in the case of *Shuffle Master, Inc.* v. *Card Austria, et al.*, Case No. CV-N-0508-HDM-(VPC) Consolidated with Case No. CV-N-02-0244-ERC-(RAM)), May 6, 2003, Part 1 of 23 (Master Index and Binder 1, 1 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 2 of 23 (Master Index and Binder 1, 2 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 3 of 23 (Master Index and Binder 2, 1 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 4 of 23 (Binder 2, 2 of 2).
Documents submitted in the case of *Shuffle Master, Inc.* v. *Card Aurstia, et al.*, Case No. CV-N-0508-HDM-(VPC) (Consolidated with Case No. CV-N-02-0244-ERC-(RAM)), May 6, 2003, scan of color pages, for clarity, Part 19 of 23 (color copies from Binder 3).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 5 of 23 (Binder 3, 1 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 6 of 23 (Binder 3, 2 of 2).
Documents submitted in the case of *Shuffle Master, Inc.* v. *Card Aurstia, et al.*, Case No. CV-N-0508-HDM-(VPC) Consolidated with Case No. CV-N-02-0244-ERC-(RAM)), May 6, 2003, scan of color pages, for clarity, Part 20 of 23 (color copies from Binder 4).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 7 of 23 (Binder 4, 1 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 8 of 23 (Binder 4, 2 of 2).
Documents submitted in case of *Shuffle Master, Inc.* v. *Card Aurstia, et al.*, Case No. CV-N-0508-HDM-(VPC) Consolidated with Case No. CV-N-02-0244-ERC-(RAM)), May 6, 2003, scan of color pages, for clarity, Part 21 of 23 (color copies from Binder 6).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 10 of 23 (Binder 6, 2 of 2).
Documents submitted in the case of *Shuffle Master, Inc.* v. *Card Austria, et al.*, Case No. CV-N-0508-HDM-(VPC) Consolidated with Case No. CV-N-02-0244-ERC-(RAM)), May 6, 2003, Part 9 of 23 (Binder 5 having no contents; Binder 6, 1 of 2).
Documents submitted in the case of *Shuffle Master, Inc.* v. *Card Austria et al.*, Case No. CV-N-0508-HDM-(VPC) (Consolidated with Case No. CV-N-02-0244-ERC-(RAM)), May 6, 2003, Part 11 of 23 (Binder 7, 1 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 12 of 23 (Binder 7, 2 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 13 of 23 (Binder 8, 1 of 5).
Documents submitted in case of *Shuffle Master, Inc.* v. *Card Aurstia, et al.*, Case No. CV-N-0508-HDM-(VPC) Consolidated with Case No. CV-N-02-0244-ERC-(RAM)), May 6, 2003, scan of color pages, for clarity, Part 22 of 23 (color copies from Binder 8, part 1 of 2).
Documents submitted in case of *Shuffle Master, Inc.* v. *Card Aurstia, et al.*, Case No. CV-N-0508-HDM-(VPC) Consolidated with Case No. CV-N-02-0244-ERC-(RAM)), May 6, 2003, scan of color pages, for clarity, Part 23 of 23 (color copies from Binder 8, part 2 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 14 of 23 (Binder 8, 2 of 5).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 15 of 23 (Binder 8, 3 of 5).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 16 of 23 (Binder 8, 4 of 5).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 17 of 23 (Binder 8, 5 of 5).
DVD labeled Exhibit 1, This is a DVD taken by Shuffle Master personnel of the live operation of a CARD One2Sil Shuffler (Oct. 7, 2003). DVD sent to Examiner by US Postal Service with this PTO/SB/08 form.
DVD labeled Morrill Decl. Ex. A is (see Binder 4-1, p. 149/206, Morrill Decl., para. 2.): A video (16 minutes) that the attorney for CARD, Robert Morrill, made to describe the Roblejo prototype card shuffler. DVD sent to Examiner by US Postal Service with this PTO/SB/08 form.
DVD labeled Solberg Decl.Ex.C, which is not a video at all, is (see Binder 4-1, p. 34/206, Solberg Decl., para.8): Computer source code for operating a computer-controlled card shuffler (an early Roblejo prototype card shuffler) and descriptive comments of how the code works. DVD sent to Examiner by US Postal Service with copy of this PTO/SB/08 form.
DVD labeled Luciano Decl. Ex. K is (see Binder 2-1, p. 215/237, Luciano Decl., para.14): A video demonstration (11minutes) of a Luciano Packaging prototype shuffler. DVD sent to Examiner by US Postal Service with this PTO/SB/08 form.
European Search Report for European Application No. 12 152 303, dated Apr. 16, 2012, 3 pages.
European Patent Application Search Report—European Patent Application No. 06772987.1, dated Dec. 10, 2009, 5 pages.
European Examination Report for European Application No. 02 780 410, dated Jan. 25, 2010, 5 pages.
European Examination Report for European Application No. 02 780 410, dated Aug. 9, 2011, 4 pages.
"Error Back propagation," http://willamette.edu~gorr/classes/cs449/backprop.html (4 pages), Nov. 13, 2008.
"i-Deal," Bally Technologies, Inc., (2014), 2 pages.
"Shufflers—SHFL entertainment," Gaming Concepts Group, (2012), 6 pages.
"TAG Archives: Shuffle Machine," Gee Wiz Online, (Mar. 25, 2013), 4 pages.
International Search Report from International Application No. PCT/IB2017/055810, dated Jan. 8, 2018, 4 pages.
International Written Opinion from International Application No. PCT/IB2017/055810, dated Jan. 8, 2018, 8 pages.
U.S. Appl. No. 15/365,610, filed Nov. 30, 2016, titled "Card Handling Devices and Related Assemblies and Components", to Helsen et al., 62 pages.
Shuflle Master, Inc. (1996). Let It Ride, The Tournament, User Guide, 72 pages.

(56) References Cited

OTHER PUBLICATIONS

CasinoTrac TableTrac Services. Product Information Datasheet [online]. CasinoTrac, 2015. Retrieved on Oct. 12, 2016 from the Internet: <URL: http://www.tabletrac.com/?pageid=15#prettyPhoto> (3 pages).

Connect2Table Administrator Manual, Jan. 7, 2013 (82 pages).

Connect2Table Quick Installation Guide, Feb. 20, 2013 (36 pages).

Connect2Table Connect2Table System Summary, generated Oct. 21, 2016 (2 pages).

Connect2Table User Manual, Feb. 7, 2013 (35 pages).

Fine, Randall A., "Talking Tables", dated Apr. 25, 2012. Global Gaming Business Magazine, vol. 11, No. 5, May 2012. Retrieved on Oct. 3, 2016 from the Internet: <URL: https://ggbmagazine.com/issue/vol-11-no-5-may-2012/article/talking-tables> (4 pages).

Neon Product Information Datasheets [online]. "Enterprise Casino Management, Table Management System, Mobile, Gaming". Intelligent Gaming, 2014. Retrieved on Oct. 12, 2016 from the Internet: <URL: http://www.intelligentgaming.co.uk/products/neon-enterprise/> (4 pages).

"Playtech Retail begins roll out of Neon across Grosvenos 55 UK Casinos". Playtech, Apr. 21, 2016. Retrieved on Oct. 11, 2016 from the Internet: <URL: https://www.playtech.com/news/latest_news_and_prs/playtech_retail_begins_roll_out_of neon_across_grosvenor_s_55_uk_casinos> (1 page).

"TableScanner (TM) from ADVANSYS", Casino Inside Magazine, No. 30, pp. 34-36 (Dec. 2012) (4 pages).

TableScanner "Accounting & Cage". Product Information Datasheets [online]. Advansys, 2013. Retrieved on Oct. 11, 2016 from the Internet: <URL: http://advansys.si/products/tablescanner/accounting-cage/> (4 pages).

TableScanner "Casino Management System". Product Information Datasheets [online]. Advansys, 2013. Retrieved on Oct. 11, 2016 from the Internet: <URL: http://advansys.si/> (6 pages).

TableScanner "Multisite". Product Information Datasheets [online]. Advansys, 2013. Retrieved on Oct. 11, 2016 from the Internet: <URL: http://advansys.si/products/tablescanner/multisite/> (3 pages).

TableScanner "Player Tracking". Product Information Datasheets [online]. Advansys, 2011 Retrieved on Sep. 23, 2016 from the Internet: <URL: http://advansys.si/products/tablescanner/player-tracking/> (4 pages).

TableScanner "Table Management system". Product Information Datasheets [online]. Advansys, 2013. Retrieved on Oct. 11, 2016 from the Internet: <URL: http://advansys.si/products/tablescanner/> (4 pages).

"TYM @ a Glance—Table Games Yield Management", TYM Live Product Information Datasheets [online]. TANGAM Systems, 2016. Retrieved on Oct. 3, 2016 from the Internet: <URL: http://tangamgaming.com/wp-content/uploads/2016/12/TG_TYMGlance_2016-V4-1.pdf> (2 pages).

Genevieve Orr, CS-449: Neural Networks Willamette University, http://www.willamette.edu/~gorr/classes/cs449/intro.html (4 pages), Fall 1999.

http://www.google.com/search?tbm=pts&q=Card+handling+devicve+with+input+and+outpu . . . Jun. 8, 2012.

http://www.ildado.com/casino_glossary.html, Feb. 1, 2001, p. 1-8.

https://web.archive.org/web/19991004000323/http://travelwizardtravel.com/majon.htm, Oct. 4, 1999, 2 pages.

http://www.google.com/search?tbm=pts&q=shuffling+zone+onOopposite+site+of+input+. . . Jul. 18, 2012.

Litwiller, Dave, CCD vs. CMOS: Facts and Fiction reprinted from Jan. 2001 Issue of Photonics Spectra, Laurin Publishing Co. Inc. (4 pages).

Malaysian Patent Application Substantive Examination Adverse Report—Malaysian Patent Application Patent No. PI 20062710, May 9, 2009, 4 pages.

PCT International Preliminary Examination Report for International Patent Application No. PCT/US02/31105 dated Jul. 28, 2004, 9 pages.

PCT International Search Report for International Application No. PCT/US2003/015393, dated Oct. 6, 2003, 2 pages.

PCT International Search Report for PCT/US2005/034737 dated Apr. 7, 2006, 1 page (WO06/039308).

PCT International Search Report for PCT/US2007/022894, dated Jun. 11, 2008, 3 pages.

PCT International Search Report and Written Opinion, PCT/US2012/48706, dated Oct. 16, 2012, 12 pages.

PCT International Search Report and Written Opinion of the International Searching Authority for PCT/US2010/001032, dated Jun. 16, 2010, 11 pages.

PCT International Search Report and Written Opinion for PCT/US07/15035, dated Sep. 29, 2008, 6 pages.

PCT International Search Report and Written Opinion for PCT/US07/15036, dated Sep. 23, 2008, 6 pages.

PCT International Search Report and Written Opinion, PCT Application No. PCT/US2015/051038, dated Jan. 22, 2016, 11 pages.

PCT International Search Report and Written Opinion of the International Searching Authority for PCT/US2008/007069, dated Sep. 8, 2008, 10 pages.

PCT International Search Report and Written Opinion, PCT Application No. PCT/US2015/022158, dated Jun. 17, 2015, 13 pages.

PCT International Search Report and Written Opinion for International Application No. PCT/US2007/023168, dated Sep. 12, 2008, 8 pages.

PCT International Search Report and Written Opinion, PCT Application No. PCT/US2015/040196, dated Jan. 15, 2016, 20 pages.

PCT International Search Report and Written Opinion, PCT Application No. PCT/US2013/062391, dated Dec. 17, 2013, 13 pages.

PCT International Search Report and Written Opinion of the International Searching Authority for PCT/US05/31400, dated Sep. 25, 2007, 12 pages.

PCT International Search Report and Written Opinion, PCT Application No. PCT/US2015/025420, dated Oct. 2, 2015, 15 pages.

PCT International Search Report and Written Opinion of the International Searching Authority for PCT/US13/59665, dated Apr. 25, 2014, 21 pages.

PCT International Search Report and Written Opinion of the International Searching Authority for PCT/IB2013/001756, dated Jan. 10, 2014, 7 pages.

PCT International Search Report and Written Opinion of the International Searching Authority for PCT/US11/59797, dated Mar. 27, 2012, 14 pages.

PCT International Search Report and Written Opinion for International Application No. PCT/US2007/022858, dated Mar. 7, 2008, 7 pages.

PCT International Search Report and Written Opinion for International Patent Application No. PCT/US2006/22911, dated Jun. 1, 2007, 6 pages.

PCT International Search Report and Written Opinion of the International Searching Authority for PCT/GB2011/051978, dated Jan. 17, 2012, 11 pages.

Philippines Patent Application Formality Examination Report—Philippines Patent Application No. 1-2006-000302, dated Jun. 13, 2006.

Press Release for Alliance Gaming Corp., Jul. 26, 2004—Alliance Gaming Announces Control with Galaxy Macau for New MindPlay Baccarat Table Technology, 2 pages, http://biz.yahoo.com/prnews.

Scarne's Encyclopedia of Games by John Scarne, 1973, "Super Contract Bridge", p. 153.

Shuffle Master Gaming, Service Manual, ACETM Single Deck Card Shuffler, (1998), 63 pages.

Shuffle Master Gaming, Service Manual, Let It Ride Bonus® With Universal Keypad, 112 pp., © 2000 Shuffle Master, Inc.

Service Manual/User Manual for Single Deck Shufflers: BG1, BG2 and BG3 by Shuffle Master © 1997, 151 page.

Singapore Patent Application Examination Report—Singapore Patent Application No. SE 2008 01914 A, dated Jun. 18, 2008, 3 pages.

SHFL Entertainment, Inc. Docket No. 60, Opening Claim Construction Brief, filed in Nevada District Court Case No. 2:12-cv-01782 with exhibits, Aug. 8, 2013, p. 1-125.

Shuffle Master's Reply Memorandum in Support of Shuffle Master's Motion for Preliminary Injunction for *Shuffle Master, Inc.* vs. *VendingData Corporation*, in the U.S. District Court, District of Nevada, No. CV-S-04-1373-JCM-LRL, Nov. 29, 2004.

(56) References Cited

OTHER PUBLICATIONS

Statement of Relevance of Cited References, Submitted as Part of a Third-Party Submission Under 37 CFR 1.290 on Dec. 7, 2012 (12 pages).
tbm=pts&hl=en Google Search for card handling device with storage area, card removing system pivoting arm and processor ; http://www.google.com/?tbrn=pts&hl=en; Jul. 28, 2012, 2 pages.
Tracking the Tables, by Jack Bularsky, Casino Journal, May 2004, vol. 17, No. 5, pp. 44-47.
United States Court of Appeals for the Federal Circuit Decision Decided Dec. 27, 2005 for Preliminary Injuction for *Shuffle Master, Inc.* vs. *VendingData Corporation*, In the U.S. District Court, District of Nevada, No. CV-S-04-1373-JCM-LRL.
VendingData Corporation's Answer and Counterclaim Jury Trial Demanded for *Shuffle Master, Inc.* vs. *VendingData Corporation*, In the U.S. District Court, District of Nevada, No. CV-S-04-1373-JCM-LRL, Oct. 25, 2004.
VendingData Corporation's Opposition to Shuffle Master Inc.'s Motion for Preliminary Injection for *Shuffle Master, Inc.* vs. *VendingData Corporation*, In the U.S. District Court, District of Nevada, No. CV-S-04-1373-JCM-LRL, Nov. 12, 2004.
VendingData Corporation's Responses to Shuffle Master, Inc.'s First set of interrogatories for *Shuffler Master, Inc.* vs. *VendingData Corporation*, In the U.S. District Court, District of Nevada, No. CV-S-04-1373-JCM-LRL, Mar. 14, 2005.
*Shuffle Tech International LLC et al.* vs. *Scientific Games Corporation et al.*, Order Denying Motion for Summary Judgement: Memorandum Opinion and Order, In the U.S. District Court, for the Northern District of Illinois Eastern Division, No. 15 C 3702, Sep. 1, 2017, 35 pages.
Weisenfeld, Bernie; Inventor betting on shuffler; Courier-Post; Sep. 11, 1990; 1 page.
Solberg, Halvard; Deposition; *Shuffle Tech International* v. *Scientific Games Corp., et al.* 1:15-cv-3702 (N.D. III.) Oct. 18, 2016; pp. 187, 224-246, 326-330, 338-339, 396; Baytowne Reporting; Panama City, FL.
Prototype Glossary and Timelines; *Shuffle Tech International* v. *Scientific Games Corp., et al.* 1:15-cv-3702 (N.D. III.); undated; pp. 1-4.
Olsen, Eddie; Automatic Shuffler 'ready' for Atlantic City experiment; Blackjack Confidential; Jul./Aug. 1989; pp. 6-7.
Gros, Roger; New Card Management System to Be Tested at Bally's Park Place; Casino Journal; Apr. 1989; 5 pages.
Gola, Steve; Deposition; *Shuffle Tech International* v. *Scientific Games Corp., et al.* 1:15-cv-3702 (N.D. III.); Oct. 13, 2016; pp. 1, 9-21, 30-69, 150-167, 186-188, 228-231, 290-315, 411; Henderson Legal Services, Inc.; Washington, DC.

* cited by examiner

DEVICES, SYSTEMS, AND RELATED METHODS FOR REAL-TIME MONITORING AND DISPLAY OF RELATED DATA FOR CASINO GAMING DEVICES

CROSS-REFERENCE TO RELATED APPLICATIONS

This application is related to U.S. patent application Ser. No. 15/096,473, filed Apr. 12, 2016, pending, which is a continuation of U.S. patent application Ser. No. 14/137,557 filed Dec. 20, 2013, now U.S. Pat. No. 9,345,951, issued May 24, 2016, which is a continuation of U.S. patent application Ser. No. 11/558,818, filed on Nov. 10, 2006, now U.S. Pat. No. 8,616,552, issued Dec. 31, 2013, which is a continuation-in-part of U.S. patent application Ser. No. 09/967,500, filed Sep. 28, 2001, now U.S. Pat. No. 8,337,296, issued Dec. 25, 2012, the disclosure of each of which is hereby incorporated herein in its entirety by this reference. The present application is also related to U.S. patent application Ser. No. 14/549,301, filed Nov. 20, 2014, now U.S. Pat. No. 9,320,964, issued Apr. 26, 2016, which is a continuation of U.S. patent application Ser. No. 13/632,875, filed Oct. 1, 2012, now U.S. Pat. No. 8,919,775, issued Dec. 30, 2014, which is a continuation-in-part of U.S. patent application Ser. No. 11/558,818, filed Nov. 10, 2006, now U.S. Pat. No. 8,616,552, issued Dec. 31, 2013, the disclosure of each of which is hereby incorporated herein in its entirety by this reference.

TECHNICAL FIELD

The present disclosure relates to casino gaming devices and, more specifically, to casino gaming devices in a communications network and related methods for real-time monitoring of the casino gaming devices.

BACKGROUND

Electronic devices used in the gaming industry are well known to be used for increasing the efficiency, security and game speed of various casino wagering games. For example, card handling devices (e.g., automatic card shufflers) may be used in live table games to perform a variety of functions, including randomly shuffling one or more decks of playing cards in an efficient and thorough manner to reduce delay during game play as well as between rounds. Card handling devices may also help to prevent players from having an advantage by knowing the position of specific cards or groups of cards in the final arrangement of cards delivered in the play of the game. Card handling devices may also include card recognition systems that verify contents of the deck and recognize the rank and suits of cards dispensed by the card handling device during game play. Other casino gaming devices may include gaming tables that include player interfaces for displaying virtual cards, displaying virtual chips for betting, receiving player inputs for entering game commands, etc. In some embodiments, gaming tables may employ a combination of physical and virtual features. For example, some gaming tables may include touch screen displays to manage some game features while also using traditional physical objects, such as physical wagering chips and/or physical playing cards. Some gaming tables include bet sensors integrated into the gaming table to detect the presence of physical wagers, side wagers, etc., in the form of chips or tokens and, in some situations, may even detect the value of the various wagers. Other casino gaming devices (e.g., roulette) may also include physical and/or virtual elements to game play.

As a result, some of the casino gaming devices may employ human control and direction during game play, such as by a card dealer or other game operator. Casino personnel often stand next to the gaming tables to observe game play to monitor game flow and outcomes. Casinos and casino personnel are very busy; therefore, efficiency of the gaming devices may help to reduce the time spent by casino personnel in monitoring these devices in order to allow the casino personnel to attend to other issues elsewhere in the casino. Some systems have used network architectures to gather data from the casino gaming devices, such as to assist in monitoring and/or in generating use-based billing for casinos that lease the devices. These conventional systems, however, have been somewhat limited in the information and presentation of data to the casino personnel.

BRIEF SUMMARY

An embodiment of the present disclosure includes a monitoring system in an environment including a plurality of casino table games which have associated, electronic card handling devices each adapted to generate card handling performance data and a communication network. The monitoring system comprises a monitoring server in communication with the network and programmed to receive the card handling performance data from the card handling devices, the performance data selected from the group consisting of one or more of shuffling data, game hand data, card dealing/distribution data, game round data, and game outcome data; and an operator station in communication with the monitoring server and including a user input device and a video display. At least one of the monitoring server or the operator station is configured to associate each card handling devices received performance data with the data generating device, and control the operator station video display to display a graphical user interface including for each of at least two casino table games graphical representations of the selected performance data.

Another embodiment includes a method of gathering and maintaining operational performance indicators for a plurality of casino table devices operably coupled to a casino network including a middleware server and a client terminal. The method comprises each of the plurality of table devices generating associated operational performance indicators, storing the operational performance indicators gathered from the plurality of table devices at the middleware server, in response to receiving a request from the client terminal at the middleware server, generating a response data set including at least some of the operational performance indicators related to at least one of the plurality of table devices, and transmitting the response data set to the requesting client terminal, and processing and presenting the response data set at one or more output devices of the client terminal.

DETAILED DESCRIPTION

Figure 1:
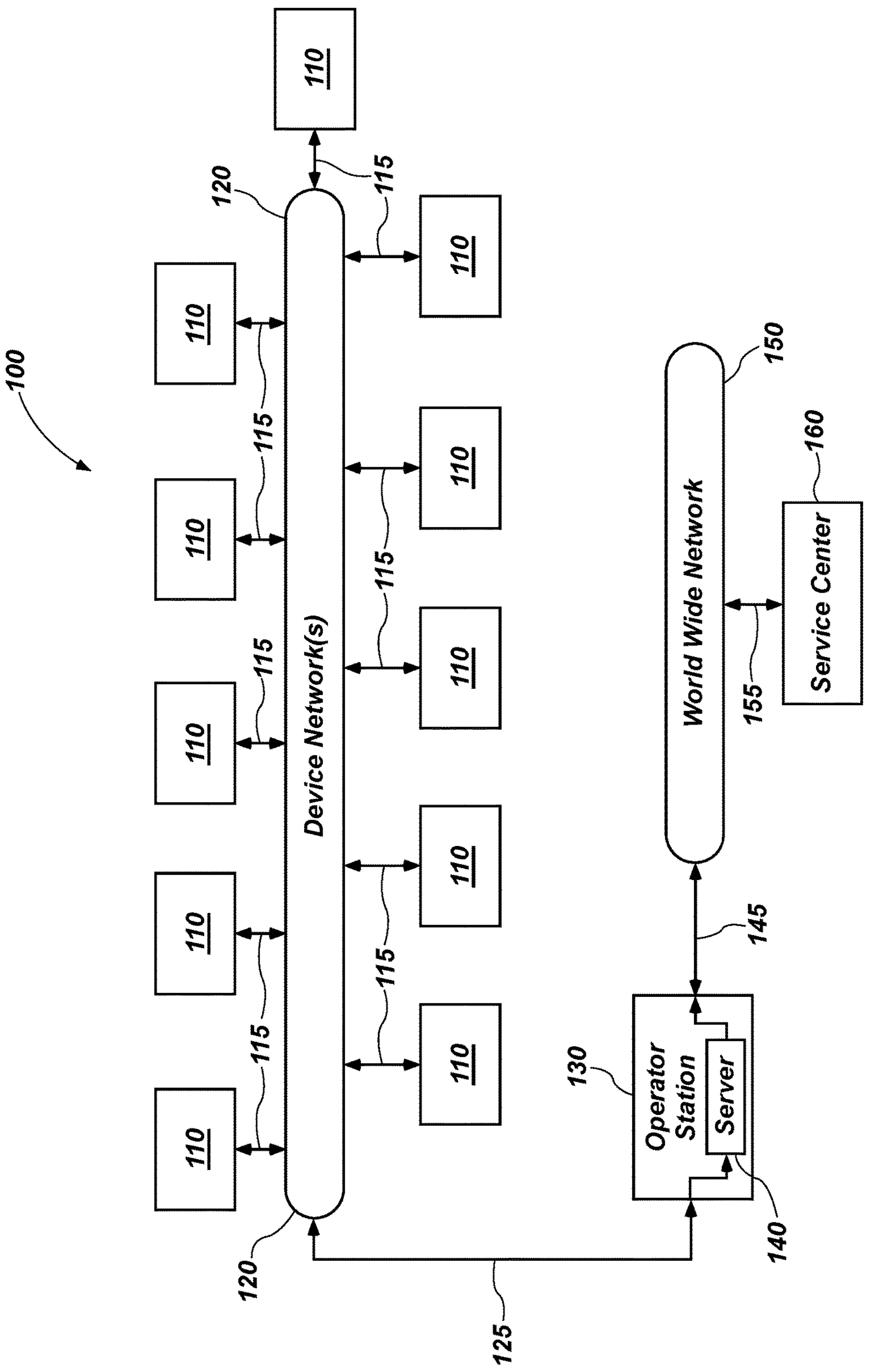
FIG. 1 is a schematic block diagram of a casino gaming device monitoring system according to an embodiment of the present disclosure.

In the following detailed description, reference is made to the accompanying drawings that form a part hereof, and in which is illustrated specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions, rearrangements, or combinations thereof within the scope of the disclosure may be made and will become apparent to those of ordinary skill in the art.

The illustrations presented herein are not meant to be actual views of any particular apparatus (e.g., device, system, etc.) or method, but are merely idealized representations that are employed to describe various embodiments of the disclosure. Accordingly, some of the drawings may be simplified for clarity. Thus, the drawings may not depict all of the components of a given apparatus (e.g., device) or all operations of a particular method. In addition, like reference numerals may be used to denote like features throughout the specification and figures.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the disclosure may be implemented on any number of data signals including a single data signal.

The various illustrative logical blocks, modules, circuits, and algorithm acts described in connection with embodiments disclosed herein may be implemented or performed with a general-purpose processor, a special-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein.

A processor herein may be any processor, controller, microcontroller, or state machine suitable for carrying out processes of the disclosure. A processor may also be implemented as a combination of computing devices, such as a combination of a DSP and a microprocessor, a plurality of microprocessors, one or more microprocessors in conjunction with a DSP core, or any other such configuration. When configured according to embodiments of the disclosure, a special-purpose computer improves the function of a computer because, absent the disclosure, the computer would not be able to carry out the processes of the disclosure. The disclosure also provides meaningful limitations in one or more particular technical environments that go beyond an abstract idea. For example, embodiments include features that improve the functionality of such monitoring systems used in the gaming industry. Thus, a new system, device, and method for monitoring casino gaming devices are described. As a result, embodiments of the present disclosure provide improvements in the technical field of networked gaming devices and related monitoring systems.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, interfacing with an operating system, etc. Furthermore, the methods disclosed herein may be implemented in hardware, software, or both. If implemented in software, the functions may be stored or transmitted as one or more instructions (e.g., software code, firmware, etc.) on a computer-readable medium. Computer-readable media includes both computer storage media and communication media including any medium that facilitates transfer of a computer program from one place to another.

FIG. 1 is a schematic block diagram of a casino gaming device monitoring system 100 (hereinafter referred to as "monitoring system 100") according to an embodiment of the present disclosure. The monitoring system 100 includes a plurality of casino gaming devices 110. The casino gaming devices 110 may be located on a casino floor for facilitating play of one or more different casino wagering games (e.g., card games, roulette, etc.). Each casino gaming device 110 is operably coupled to one or more device networks 120 (e.g., via corresponding communication links 115). The monitoring system 100 may further include a monitoring server 140 that is operably coupled with the one or more device networks 120 (e.g., via communication link 125). Data stored in the monitoring server 140 may be accessible by an operator station 130. In some embodiments, the monitoring server 140 may be located within the operator station 130 (e.g., as shown in FIG. 5). In some embodiments, the operator station 130 and the monitoring server 140 may be located separate from each other. The monitoring server 140 may also be referred to as "utility server" or "middleware server." The operator station 130 may also be referred to as a "client terminal."

In some embodiments, the operator station 130 and the monitoring server 140 may be located within the casino property, whereas in other embodiments the operator station 130 and/or monitoring server 140 may be located remote from the casino property. In an embodiment in which either the operator station 130 and/or the monitoring server 140 are located remote from the casino property, the operator station 130 and the monitoring server 140 may still be operated and administered by casino personnel. In some embodiments, the monitoring system 100 may further include a service center 160 operably coupled (e.g., via communication links 145, 155 over a world wide network 150) to the monitoring server 140. The service center 160 may also be located either on the casino property or at a remote location. In some embodiments, the service 160 and/or operator station 130 and monitoring server 140 may service gaming devices 110 at geographically different casinos. The communication links 115, 125, 145, 155 may include any form of wireless or wired connections, or any combination thereof.

The casino gaming devices 110 may include network-compatible casino gaming devices. For example, the casino gaming devices 110 may include one or more card handling devices (e.g., electro-mechanical smart card shufflers such as described in Wadds, et al., Ser. No. 14/549,301 filed Nov. 20, 2014 and titled "System for Billing Usage of a Card Handling Device" and electronic card handling and reading card shoes such as described in Grauzer, et al., U.S. Pat. No. 8,511,684 filed Jan. 16, 2009 and titled "Card-reading Shoe with Inventory Correction Feature and methods of Correcting Inventory," the disclosures of each which are hereby incorporated herein in its entirety by this reference), electronic gaming tables, roulette tables, progressive support equipment such as meters and displays and combinations thereof. In addition, sub-components of such devices may also be network-compatible, such as individual player stations, wagering sensors, dealer stations, game operator stations, a dolly sensor, roulette wheels, chip sorters, chip dispensers, etc.

Each individual casino gaming device 110 may be configured to be uniquely identified according to one or more unique identifiers assigned thereto. The unique identifiers may be encrypted and stored within memory of the casino gaming device 110 and/or within an associated memory device. For example, an external memory device may be mounted to a gaming table and connected to the casino gaming device 110. In some embodiments, the unique identifier may be unique as to the casino gaming device itself as a device identifier (e.g., device serial number or a unique network interface identifier). For example, if the casino gaming device 110 is a shuffler, the identifier may be a shuffler identifier. If the casino gaming device 110 is a gaming table, the identifier may be a table identifier, and so on. In some embodiments, the unique identifier may be assigned to all devices at a specific station. For example, the shuffler, sensors, etc., at a single gaming table may all be assigned the same table identifier. Each casino gaming device 110 may also be assigned additional identifiers, such as having a pit name that is shared with other casino gaming devices 110 located within the same pit, or having a section name that is shared with a subset of casino gaming devices 110 located within the a section of the same pit. An additional identifier may include a game identifier that is used to identify which wagering game is currently assigned to the casino gaming device 110. The messaging protocol between the gaming devices 110 and the network 120 may include message headers identifying the gaming device 110 (or each reporting component), and/or other identifiers such as a table identifier, a location reference and a casino property reference.

The monitoring server 140 may be configured to identify each individual casino gaming device 110 based on the unique identifier(s) assigned to the different casino gaming devices 110 coupled thereto. For example, during installation of the casino gaming devices 110 the casino gaming device 110 may retrieve the unique identifier and transmit the unique identifier to the monitoring server 140. The casino gaming devices 110 may also be configured to retrieve and transmit the unique identifiers to the monitoring server 140 at other instances, such as power up or other triggering events. In some embodiments, the monitoring server 140 may be configured to assign Internet Protocol (IP) addresses to the different casino gaming device 110 responsive to receiving a unique identifier therefrom.

The monitoring server 140 and the casino gaming devices 110 may be configured to communicate with each other via one or more different protocol formats. For example, some casino gaming devices 110 may communicate over a first protocol, whereas other casino gaming devices 110 may communicate over a second protocol. As a result, the monitoring server 140 may be configured to communicate with different types of casino gaming devices 110 (e.g., gaming tables, card shufflers, roulette tables, etc.) at the same time, which may also be produced by different gaming device manufacturers.

The monitoring server 140 may further be configured to receive operational performance data (i.e., game data) from all devices in real-time during operation thereof and perform real-time analysis on the operational data. The monitoring server 140 may also create and manage a game operation database 142 (FIG. 3) stored therein that receives the game data available from the various casino gaming devices 110. The monitoring server 140 may identify the data type of the received game data to determine how to handle the received game data for writing into the pre-defined database sections.

For card handling devices 110, the game data collected by the card handling device 110 and transmitted to the monitoring server 140 may include shuffling data, game hand data, card dealing/distribution data, game round data, game outcome data, and combinations thereof. The card handling devices 110 may be used for different types of card games. For example, the card handling device 110 may be configured to facilitate play of house-banked card games or other forms of card games. For roulette devices, the game data may include spin data, outcome data, and combinations thereof. In some embodiments, additional data such as wager data and player data may also be collected and transmitted to the monitoring server 140 by various casino gaming devices and/or sub-components thereof.

The operator station 130 may be configured to generate and display various reports in real-time based on the game data stored in the game operation database 142 of the monitoring server 140 in order to assist casino personnel to improve yield and productivity of the casino gaming devices 110. The game operation database 142 may also be made available for integration with other table management systems within the casino and/or third party systems, wherein the game data may be used for player tracking, determining player proficiency or possible irregular or improper play events, game optimization, game reports, table reports, dealer performance reports, utilization reports, service schedules, and combinations thereof. Optionally, the operator station 130 may also analyze the game data to generate real-time alerts to casino management (optional) and/or the service center 160 in the event of detection of any service outages or other irregularities.

An administrator may be provided with administrator access to the monitoring server 140 and its game operation database 142. Administrator access may be granted using the operator station 130 via the local casino network and/or through remote access through a remote device connected via the world wide network 150. The administrator access may permit the administrator to perform certain tasks, such as to assign casino gaming devices 110 to different gaming tables, set regular intervals for the monitoring server 140 to receive game data from the casino gaming devices 110, and/or define time periods (e.g., daily, weekly, etc.) for generating long term reports based on the game data. In some embodiments, the administrator may set chip values accepted for the different wagering games supported by the casino gaming devices 110.

An operator (e.g., a pit manager) may be provided with user access to the monitoring server 140 and its game operation database 142. User access may be granted using the operator station 130 via the local casino network and/or through remote access through a remote device connected via the world wide network 150. The user access may permit the operator perform certain tasks, such as viewing real-time reports displayed by the operator station 130. Long term reports may also be generated and displayed by the operator station 130.

For card handling devices 110, the reports may include total rounds per hour, total player hands dealt per hour, average players per round per hour, revenue per hour, wager values for individual players as well as for all players serviced by a particular gaming device 110. Such reports may be generated and viewable for each individual card handling device 110 or reporting component thereof. As a result, a report for each individual card handling device 110 may be viewable simultaneously for the operator to compare real-time performance across the entire network of card handling devices 110. In some embodiments, the game data may be aggregated across all card handling devices 110 of the device network 120 to generate and display the rounds per hour, player hands per hour, average players per round per hour, and revenue per hour in the aggregate for all card handling devices of the casino network and/or as an average across all card handling devices of the casino network. In some embodiments, reports may be generated that display comparisons of different card handling devices 110 against each other or the average values for all gaming devices 110 across the casino network 120. In each of these examples, an hour is used as the time period for measurement; however, other time periods are contemplated (e.g., 15 minutes).

For roulette gaming devices 110, the reports may include total number of spins per hour, revenue per hour, average players per spin per hour, wager values for individual players as well as for all players at a roulette table and outcomes. Such reports may be generated and viewable for each individual roulette gaming device 110. As a result, a report for each individual roulette gaming device 110 may be viewable simultaneously for the operator to compare real-time performance across the entire network of roulette gaming devices 110. In some embodiments, the game data may be aggregated across all roulette gaming devices 110 of the device network 120 to generate and display the spins per hour, revenue per hour, average players per spin per hour, wager values in the aggregate for all roulette gaming devices 110 of the casino network 120 and/or as an average across all roulette gaming devices 110 of the casino network 120. In some embodiments, reports may be generated that display comparisons of different roulette gaming devices 110 against each other or the average values for all roulette gaming devices 110 across the casino network 120. In each of these examples, an hour is used as the time period for measurement; however, other time periods are contemplated (e.g., 15 minutes).

Such reports of the different gaming devices 110 may be updated in real time on a dashboard view of a graphical user interface displaying the reports for all casino gaming devices 110 of the casino network 120. As a result, casino personnel may review profitability metrics of the casino gaming devices 110 simultaneously in order to improve table yield and determine irregularities in operation or performance. Logging the duration and intensity of use for each individual casino gaming device 110 may also be used by the casino personnel for setting service schedules, workforce schedules and gaming device 110 usage rotation to do so more efficiently.

In some embodiments, game outcomes may be reported to the monitoring server 140 and displayed to the operator station 130. For example, jackpot or progressive wins and other high value winning events may be reported to the monitoring server 140 after the round has finished for verification by the pit manager. In addition, during the session of an anonymous player (e.g., a player who is not identified by a player loyalty card), the player's average wager as well as the overall turnover during a specific time frame may be tracked, which may be used to identifying the anonymous player as a potential VIP.

Performance of some gaming devices 110 may also be monitored to detect irregularities such as, for example, dealer-player collusion, improper card counting, outcome biases and betting patterns which may suggest improper activities or the like. Algorithms may be applied to automatically flag gaming devices associated with such activities for detailed monitoring.

Figure 2:
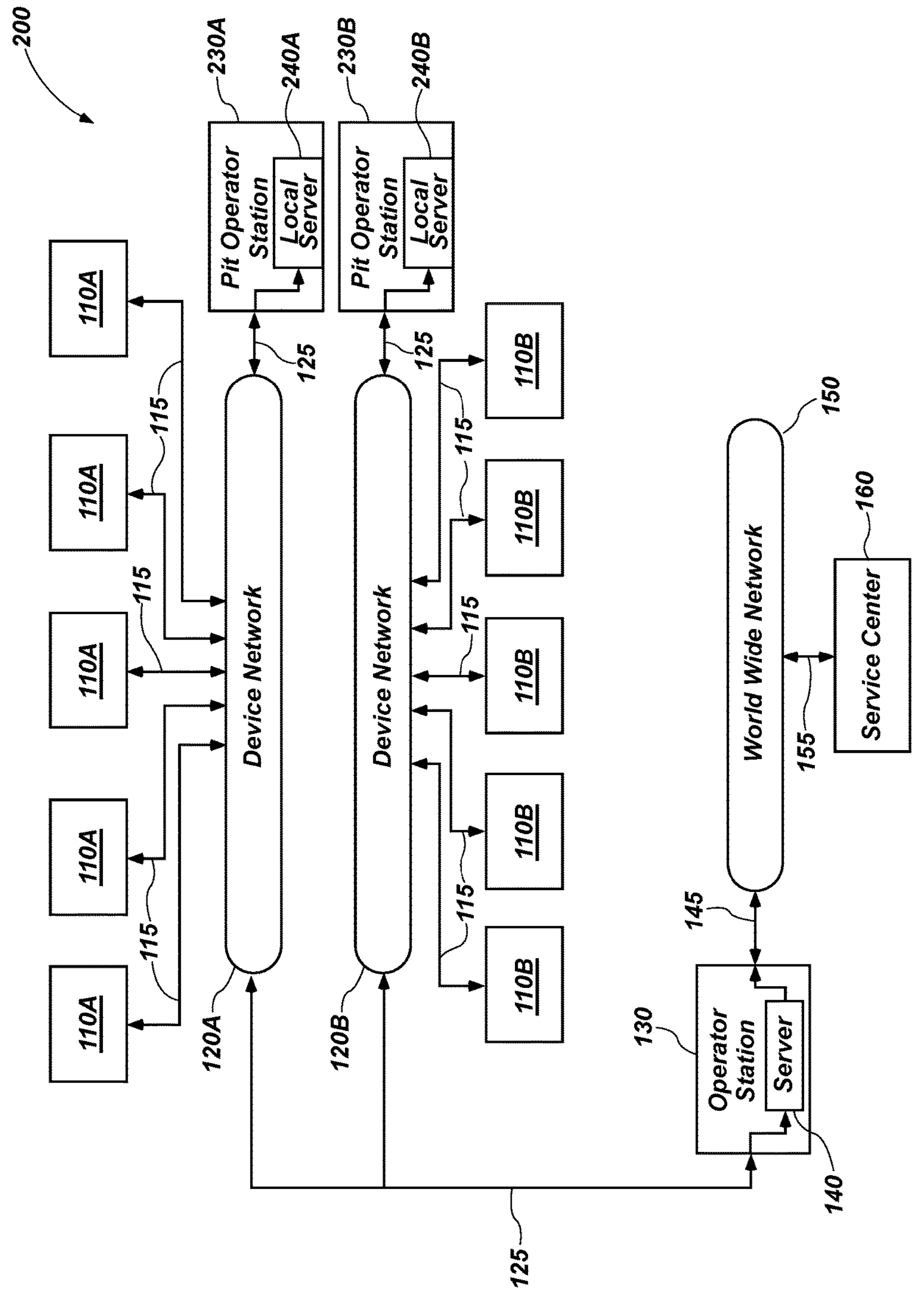
FIG. 2 is a schematic block diagram of a casino gaming device monitoring system according to another embodiment of the present disclosure.

FIG. 2 is a schematic block diagram of a casino gaming device monitoring system 200 (hereinafter referred to as "monitoring system 200") according to another embodiment of the present disclosure. The monitoring system 200 may include a plurality of casino gaming devices 110A, 110B located on a casino floor for facilitating play of one or more different casino wagering games (e.g., card games, roulette, etc.). Each casino gaming device 110A, 110B is operably coupled to one or more device networks 120A, 120B. For example, a first set of casino gaming devices 110A may be coupled to a first device network 120A, and a second set of casino gaming devices 110B may be coupled to a second device network 120B. The first set of casino gaming devices 110A may be configured to facilitate a first type of wagering game (e.g., a card game), and the second set of casino gaming devices 110B may be configured to facilitate a second type of wagering game (e.g., roulette).

In the embodiment of FIG. 2, the monitoring system 200 may further include additional operator stations 230A, 230B and local monitoring servers 240A, 240B. The first monitoring server 240A and corresponding first operator station 230A may be coupled to the first device network 120A to receive game data from the first set of casino gaming devices 110A. The second monitoring server 240B and corresponding second operator station 230B may be coupled to the second device network 120B to receive game data from the second set of casino gaming devices 110B. The monitoring system 200 may still include the monitoring server 140 as described in FIG. 1 to receive game data from the casino gaming devices 110A, 110B of the entire casino network so that all game data is accessible to simultaneously to a single operator. The embodiment of FIG. 2 differs from FIG. 1 in that it also enables local pit operators to have a limited subset of the data for a particular group of casino gaming devices 110A, 110B. Each of the additional operator stations 230A, 230B may be configured to generate and display similar reports as discussed above, but limited to the specific casino gaming devices 110A, 110B connected to its respective device network 120A, 120B.

Figure 3:
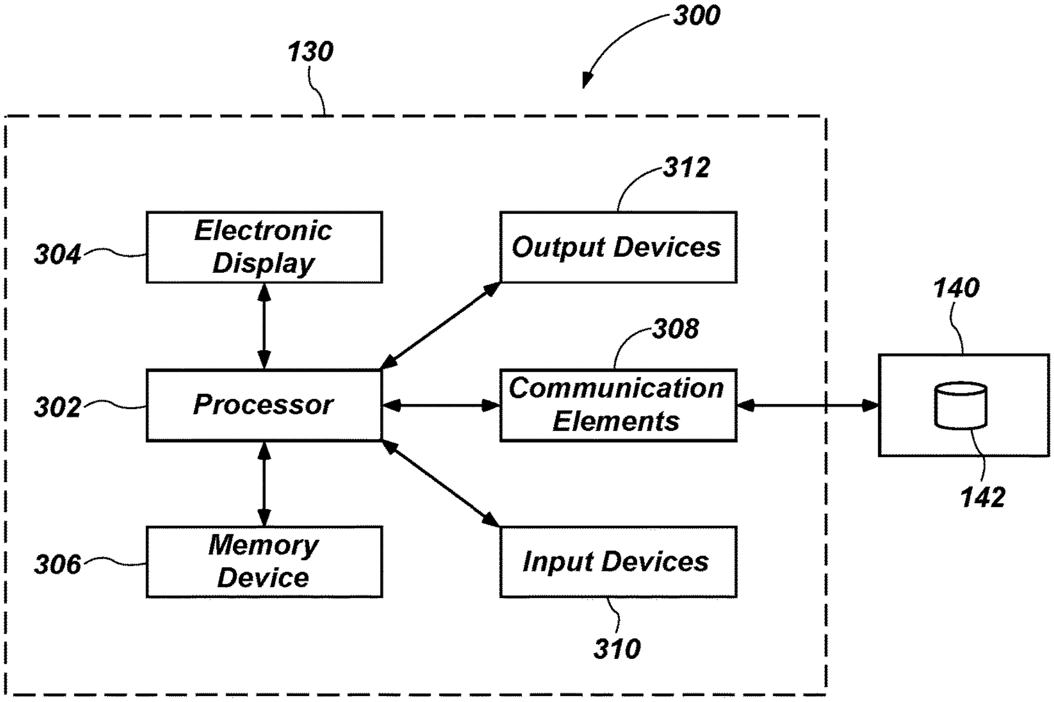
FIG. 3 is a schematic block diagram of the operator station and the monitoring server according to an embodiment of the present disclosure.

FIG. 3 is a schematic block diagram 300 of the operator station 130 and the monitoring server 140 according to an embodiment of the present disclosure. The operator station 130 includes a processor 302 operably coupled with an electronic video display 304, a memory device 306, communication elements 308, input devices 310 (e.g., mouse, keyboard, voice activation devices, etc.), and output devices 312 (e.g., printer). The video display 304 may include touch screen capability. The memory device 306 may include volatile and non-volatile storage memory, which may include computer-readable instructions (e.g., software, firmware, operating system, etc.) for the processor 302 to execute to perform the functions described herein. The operator station 130 may be a consumer electronic device, such as a desktop computer, a laptop computer, a tablet computer, a smart phone or other type of computing device. The monitoring server 140 may store the game operation database 142, from which the operator station 130 may retrieve the game operation data for generating and displaying real-time reports and other reports to monitor the operation, efficiency, etc., of the casino gaming device 110 and or the dealer.

As described above, the operator station 130 and the monitoring server 140 may be separate devices such that they communicate with each other through communication devices for external communication therebetween. In some embodiments, the operator station 130 and the monitoring server 140 may be integrally formed such that the monitoring server 140 is internal to the operator station 130 with the game operation database 142 stored in the memory device 306 or other storage medium within the operator station 130.

FIGS. 4A-4H illustrate a graphical user interface 400 having a dashboard view for various graphical elements that may be generated and displayed by the operator station 130 using the game data stored in the game operation database 142 of the monitoring server 140. In particular, FIGS. 4A-4H show different views and features that may be displayed by the graphical user interface 400 for monitoring operation of the casino gaming devices.

Figure 4A:
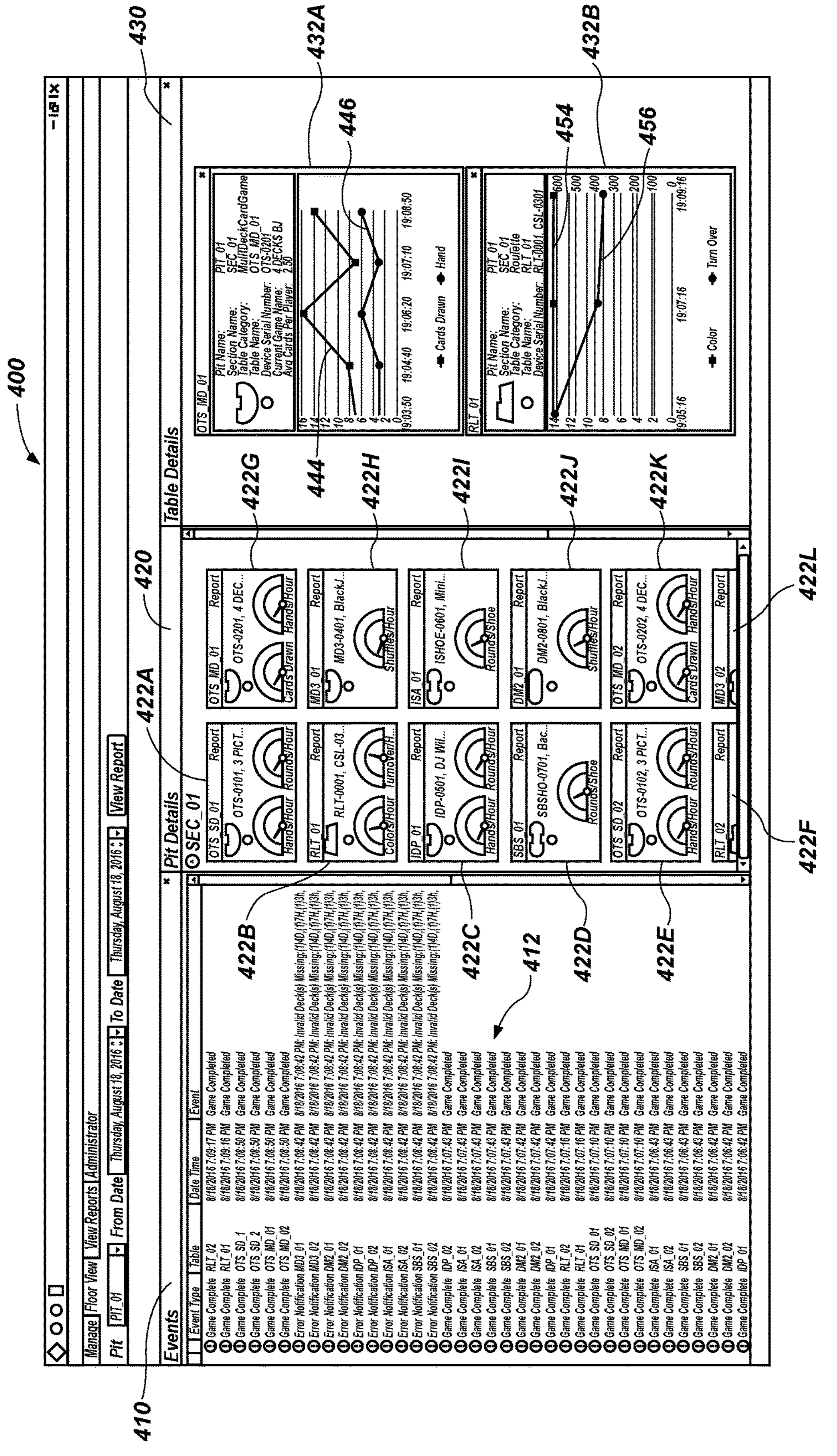
FIGS. 4A-4H illustrate a graphical user interface having a dashboard view for various graphical elements that may be generated and displayed by the operator station using the game data stored in the game operation database of the monitoring server.
Figure 4B:
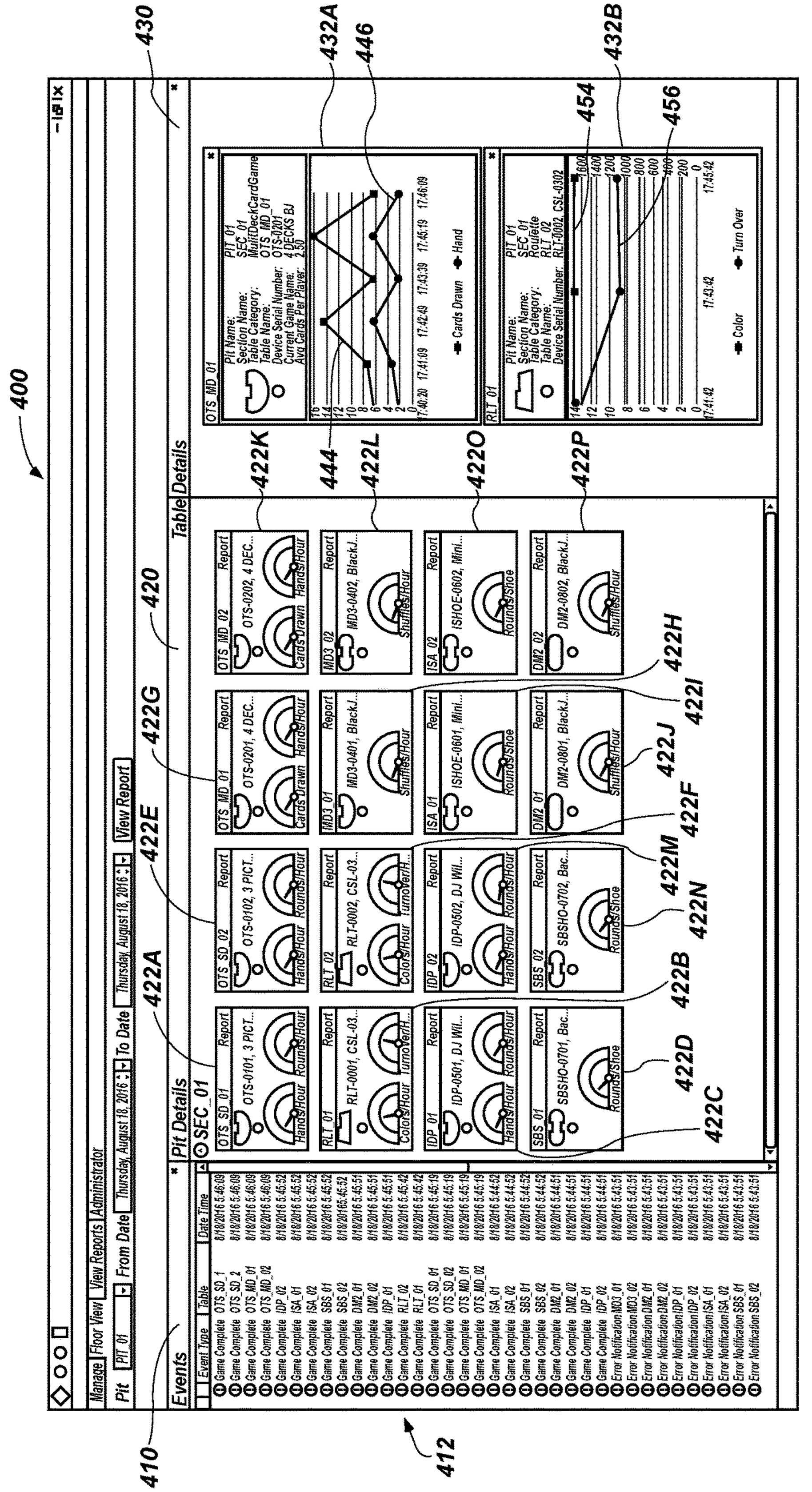

Referring specifically to FIGS. 4A and 4B, the graphical user interface 400 may include a real-time dashboard that presents updated game data in real time. The graphical user interface 400 may include an events area 410 that is configured to display one or more log entries for game events 412 for the different casino gaming devices 110. The graphical user interface 400 may also include a pit details area 420 that is configured to graphically display different operational rate graphics 422A-422L (FIG. 4A), 422A-422P (FIG. 4B) for the different casino gaming devices 110. The graphical user interface 400 may also include a table details area 430 that is configured to display different operational graphs 432A, 432B for the different casino gaming devices 110. These different areas 410, 420, 430 may be part of a floor view option offered by the graphical user interface 400 for providing information and reports for the casino gaming devices 110 that are grouped together on a particular floor (e.g., pit) of the casino.

In some embodiments, each of the events area 410, pit details area 420, and table details area 430 may be implemented as separate windows that may be adjusted (e.g., repositioned, resized, minimized, etc.) by the user. For example, as shown in FIG. 4B the pit details area 420 may be resized so that the operational rate graphics 422A-422L are rearranged within the pit details area 420 and additional operational rate graphics 422M-422P are viewable within the pit details area 420 without needing to scroll down as in the case of FIG. 4A. In some embodiments, one or more of the events area 410, pit details area 420, or table details area 430 may be embedded in the graphical user interface 400 such that its size and/or position may be fixed.

The events area 410 may be populated with log entries for game events 412 for the different casino gaming devices 110. As new events are completed, new log entries may be added in real-time to the events area 410. Each log entry may include an event type (e.g., game complete, error notification) that completed at a specific date and time (e.g., Aug. 18, 2016 at 8:09:17 PM) for a particular table defined by its unique table identifier (e.g., RLT_02, RLT_01, OTS_SD_1, etc.). The log entry may also include an event description (e.g., game complete, missing cards, invalid deck, etc.).

The pit details area 420 may be populated with different operational rate graphics 422A-422P for the different casino gaming devices 110. Each operational rate graphic 422A-422P may graphically depict an operational rate (e.g., as a meter, bar graph, etc.) in real-time for a particular casino gaming device 110. For example, a first operational rate graphic 422A may depict two operational rates for the hands per hour dealt by the card handling device 110 (e.g., shoe or shoe/shuffler) and the number of rounds per hour completed at the specific table defined by the table identifier OTS_SD_1. Likewise, a second operational rate graphic 422B may depict two operational rates for the colors per hour and the turnover per hour at the roulette table defined by the table identifier RLT_01. As used herein, "color" refers to a unique player at a roulette table as some roulette tables (e.g., particularly those that only allow wagers having one value) assign different color chips to the different players. The term "turnover" refers to the revenue received by the roulette table. The other operational rate graphics 422C-422P may similarly depict various operational rates that may be specifically tailored to the gaming device 110 type and/or game type assigned to a particular table. Additional operational rates may include, for example, cards drawn/hour, shuffles/hour, rounds/shoe, and other rates that indicate the efficiency of the device or dealer and/or the profitability of the gaming device 110.

The table details area 430 may include additional real-time reports 432A, 432B for individual tables within the pit. For example, a first real-time table report 432A may show the number of cards drawn (line 444) or the number of hands dealt (line 446) since the last real-time reading. The first real-time table report may also show table identifying information, such as the pit name, section name, table category, unique table name, device serial number, the current game being played, and the average card dealt per player for the game of blackjack (which is the current game being played in the example shown). As another example, a second real-time table report 432B may show the unique players (i.e., colors, line 454) playing a roulette game and the amount of turnover (i.e., revenue, line 456) since the last real-time reading.

During the real-time analysis, the operator station 130 may generate real-time management alerts to the casino personnel responsive to certain trends or thresholds being identified. For example, a potential VIP may be identified responsive to detecting an average bet from an individual player that exceeds a predetermined threshold. As a result, a manager may be alerted regarding the existence of a potential VIP. In addition, an alert may be generated if there exists a deviation over a predetermined target roulette game spin rate, a target table game round rate, etc. In some embodiments, an alert may be generated to casino personnel to recommend opening a new table based on the real-time usage of the various tables in the pit. In other embodiments, the real-time data may be analyzed to calculate the theoretical win rate (e.g., turnover multiplied by the house edge) to compare with the actual results to generate an alert if the actual win rate deviates from the theoretical win rate substantially over time.

Additional outcome data may also be captured by the card handling devices 110 employing card recognition systems to track individual cards and hands that are dealt. Such data may also be compared to determine if the dealt hands (e.g., royal flush, full house, etc.) deviate substantially from the theoretical rate for the winning hands.

Figure 4C:
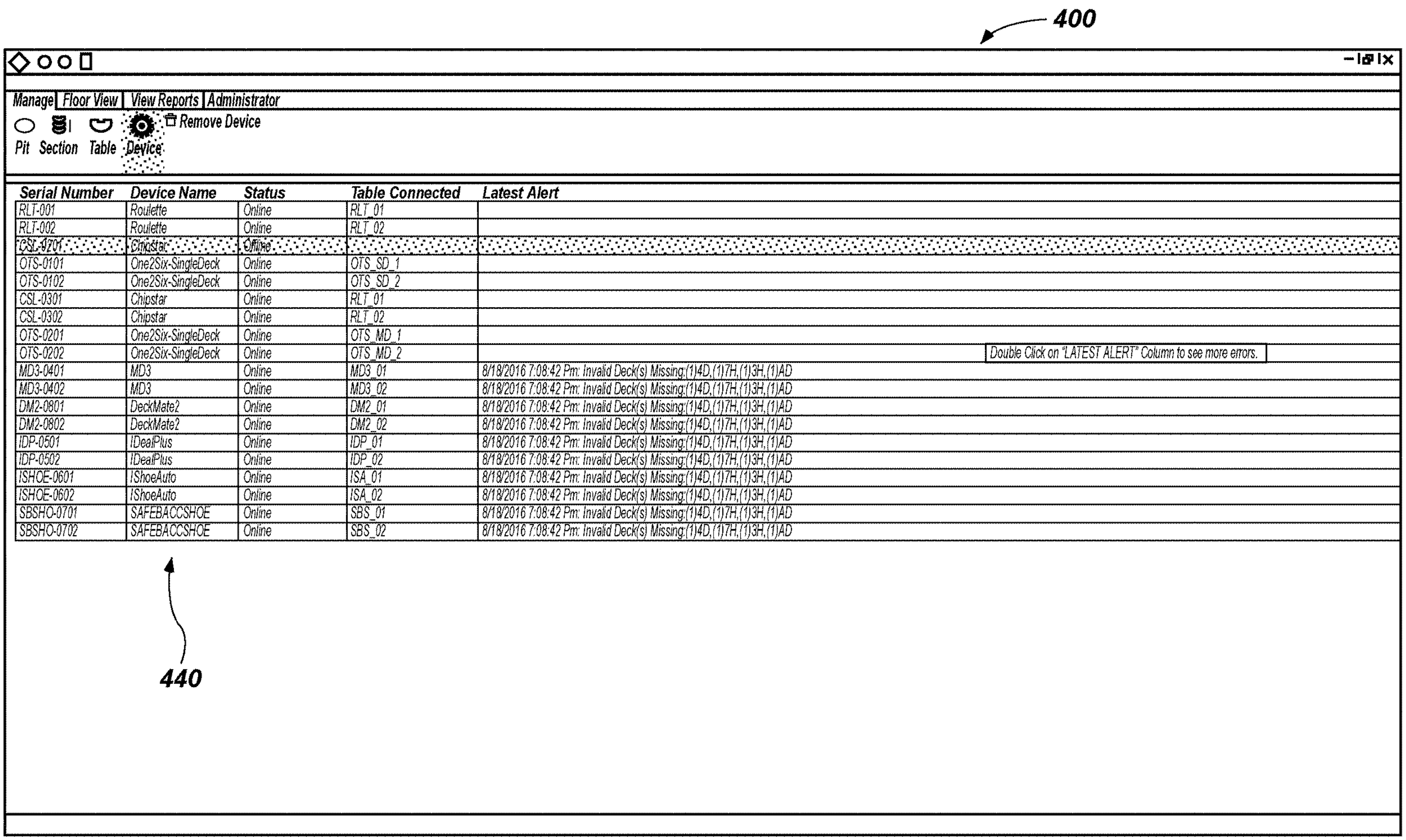
Figure 4D:
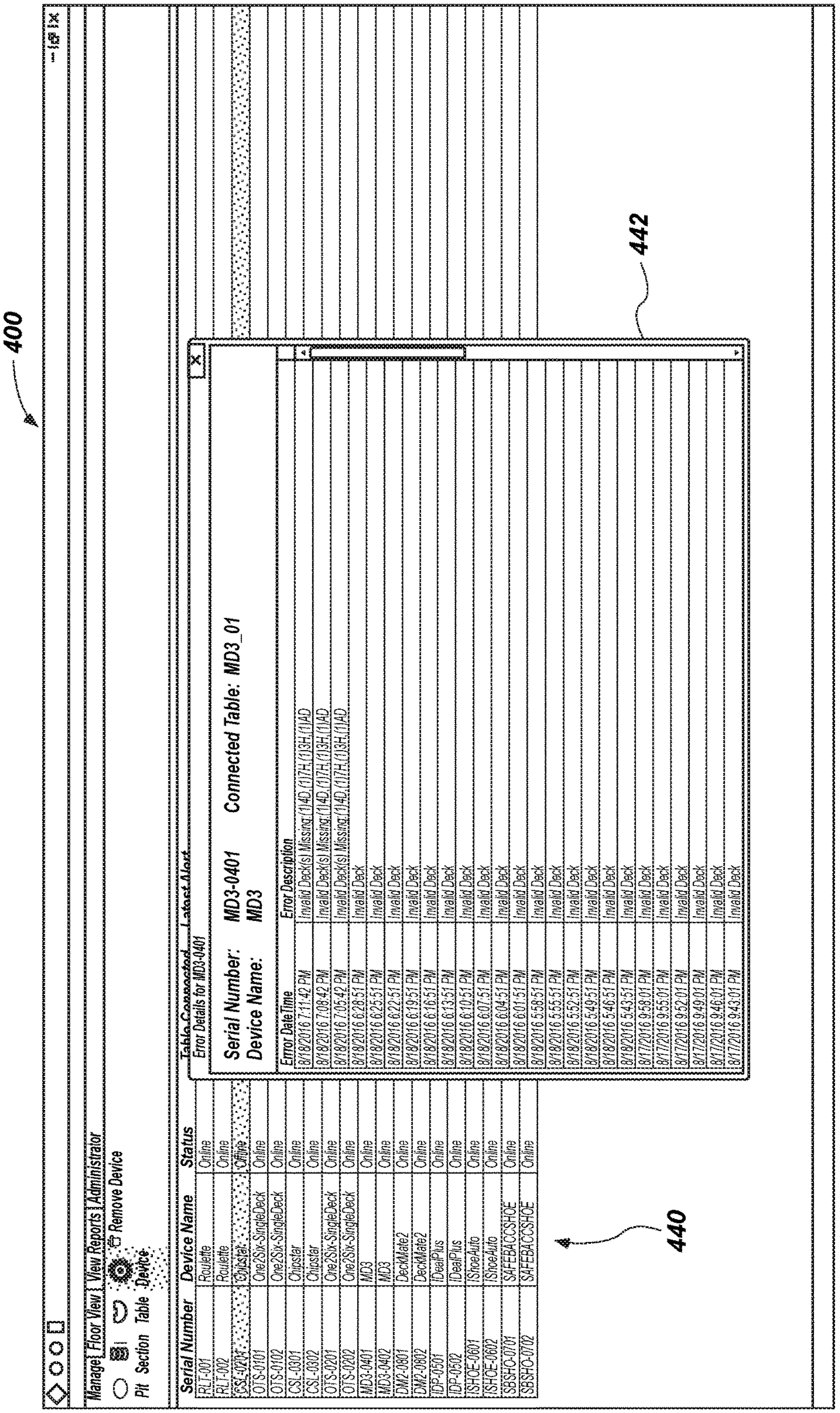

Referring specifically to FIG. 4C, the graphical user interface 400 may include a management portal in which the user may review entries 440 to identify the current status of the different casino gaming devices 110. For example, FIG. 4C shows a device-level listing of the different gaming devices 110 (e.g., identified by serial number) linked to the monitoring server 140. The different gaming devices 110 (e.g., a roulette wheel, a chip sorter, and various configurations of card shufflers and electronic shoes) may be viewable individually to see the status (e.g., online vs. offline), the table to which the device is connected, as well as the most recent alert. The graphical user interface 400 may also provide the user with the option to view different levels of listings (e.g., a table-level listing, a section-level listing, and also a pit-level listing of different devices) that are linked to the monitoring server. Referring specifically to FIG. 4D, a new window 442 may be opened responsive to the user selecting one of the entries to view an expanded list of prior alerts for a specific gaming device 110.

Figure 4E:
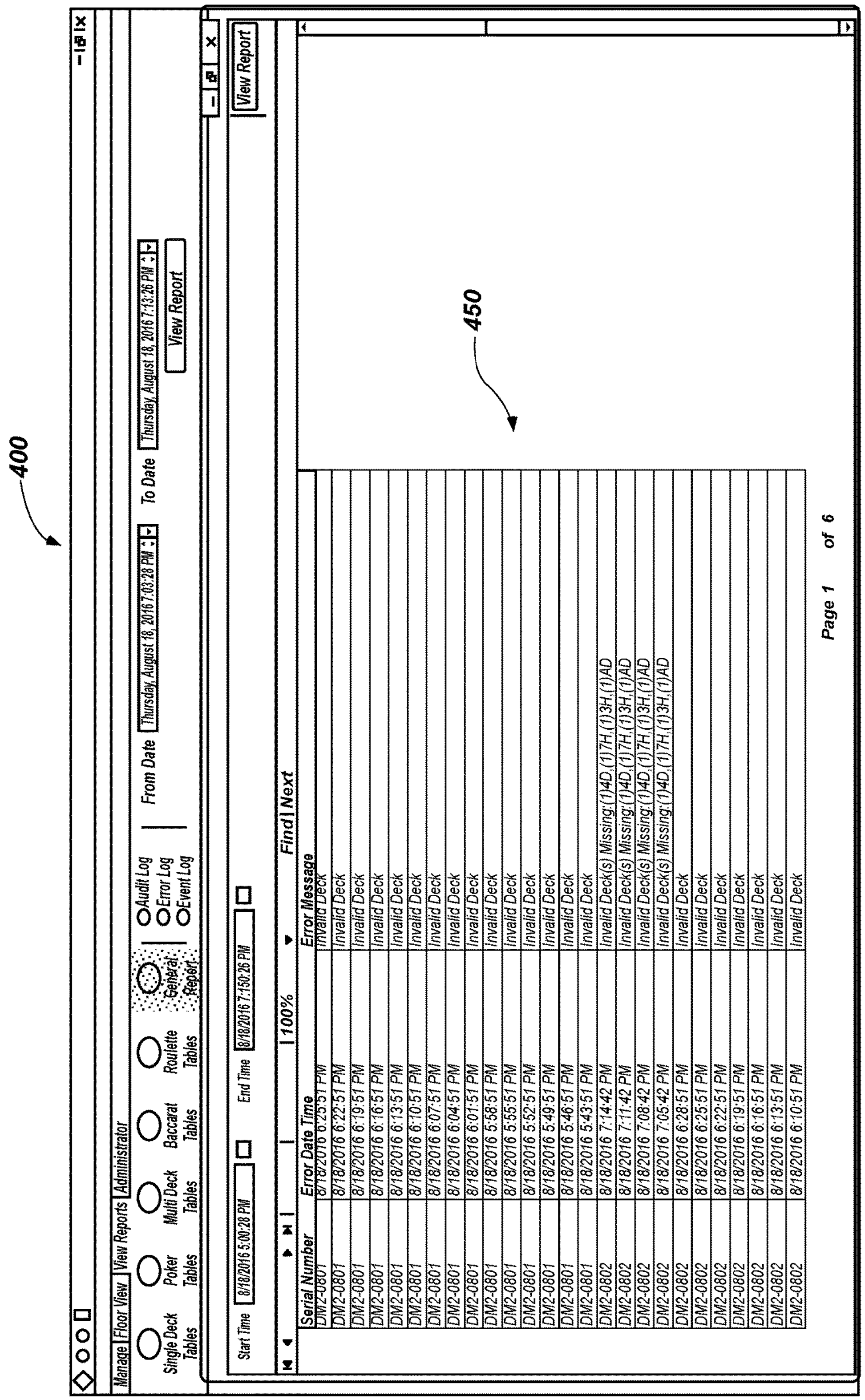

Referring specifically to FIG. 4E, the graphical user interface 400 may include a report portal in which the user may generate reports 450 for the different gaming devices 110 linked to the monitoring server 140. The reports may be sorted as a general report (e.g., all devices) or filtered according to individual device types (e.g., single deck tables, multi-deck tables, baccarat tables, roulette tables, etc.).

Figure 4F:
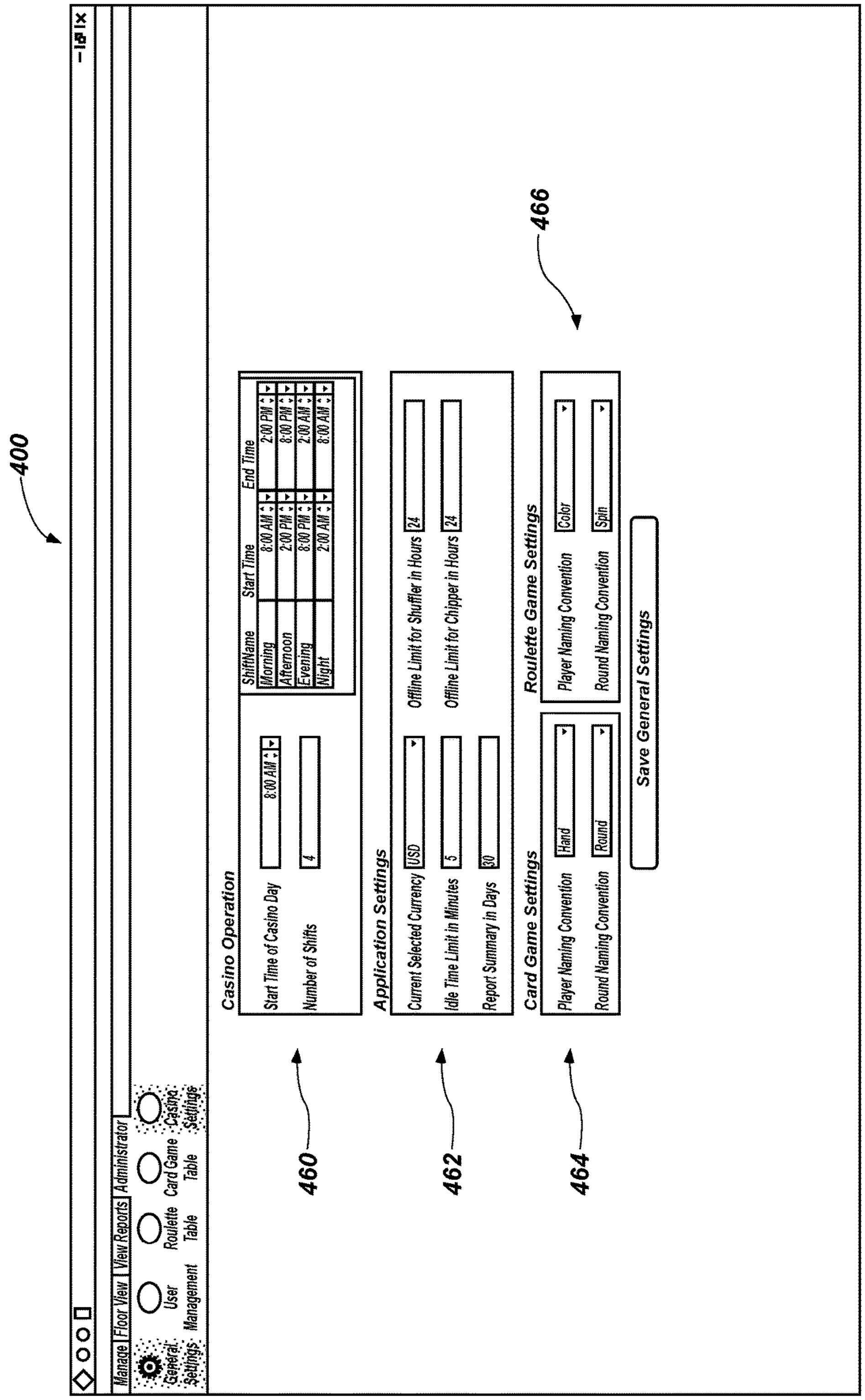
Figure 4G:
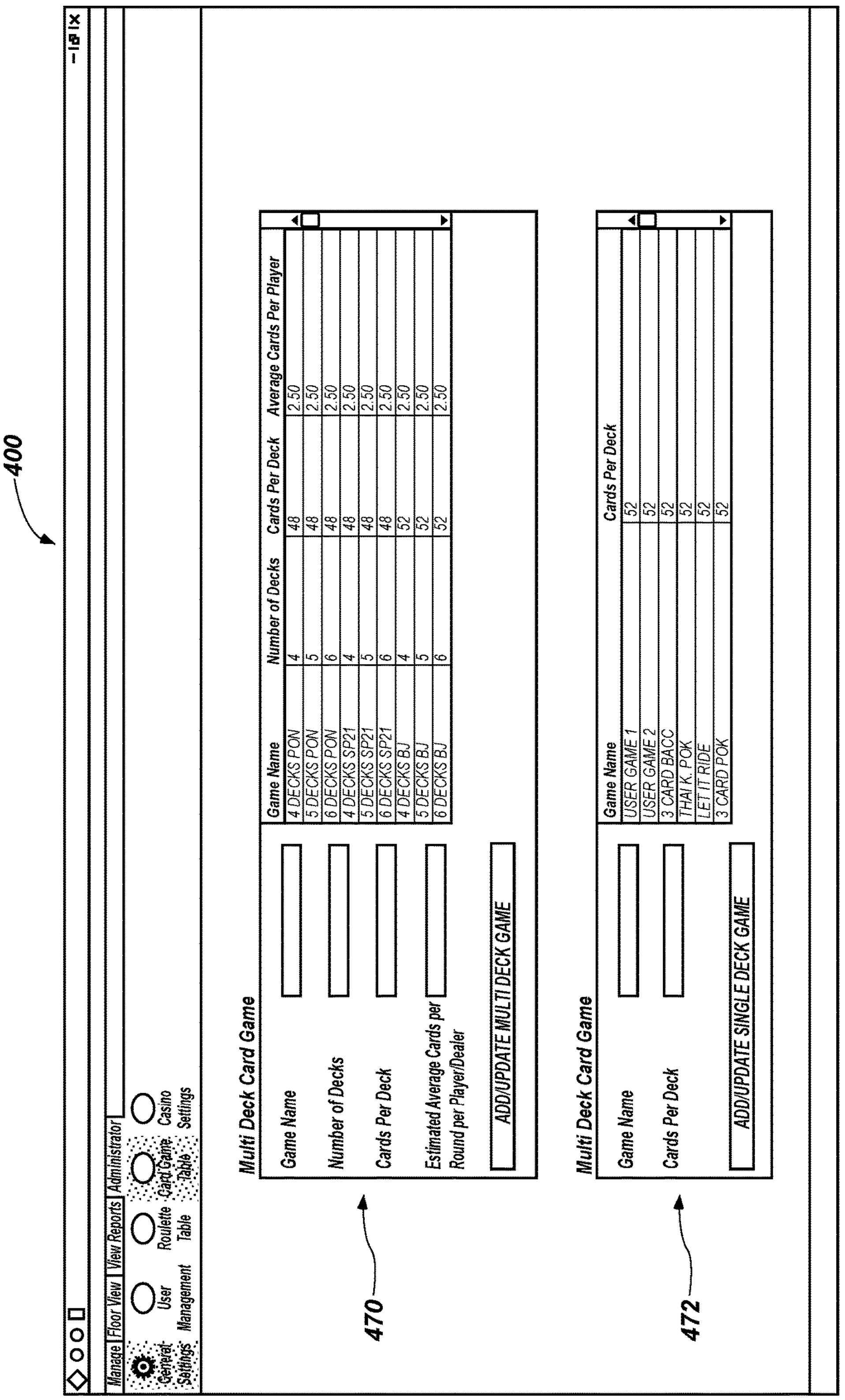
Figure 4H:
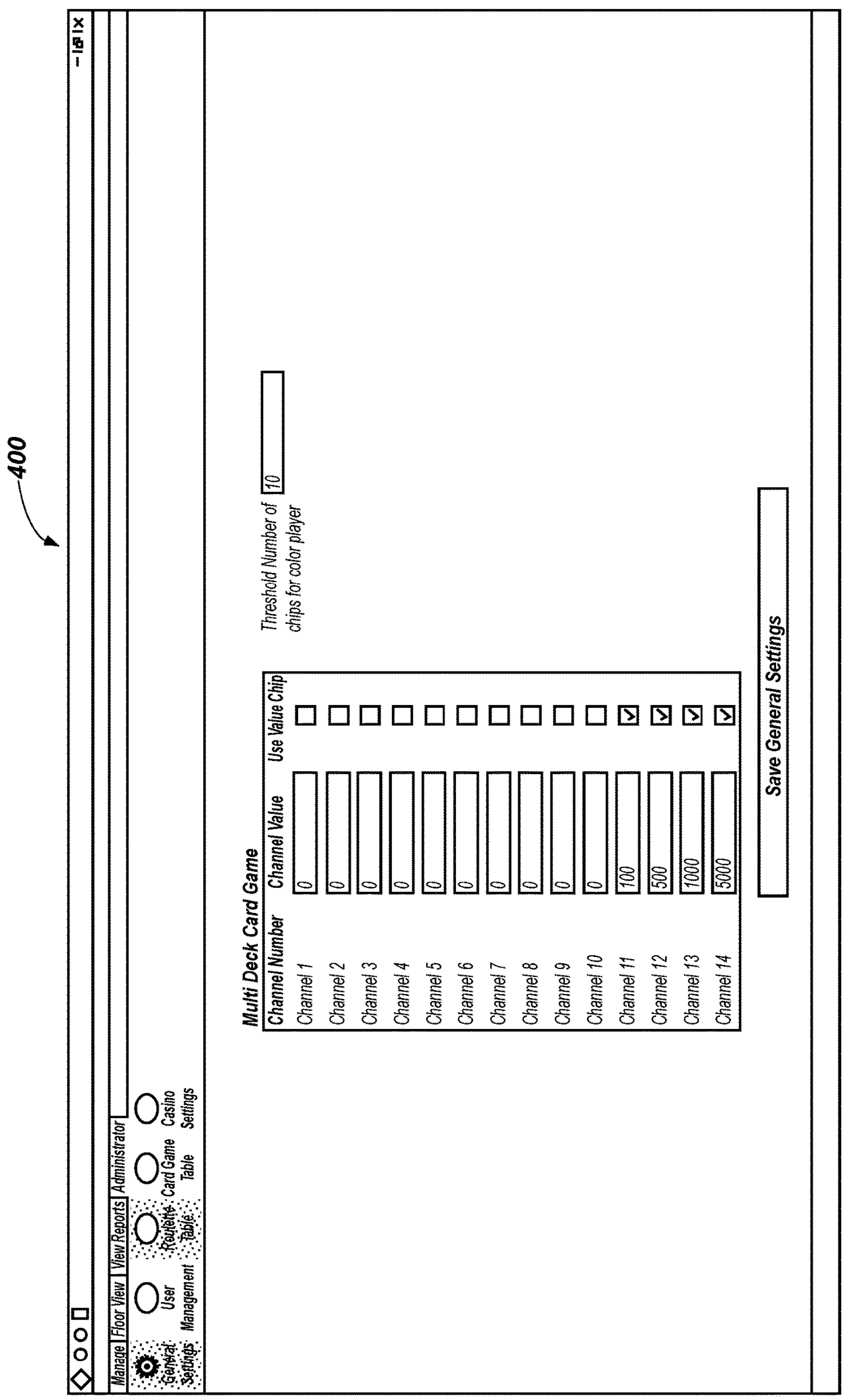

Referring specifically to FIGS. 4F-4H, the graphical user interface 400 may further include an administrator portal in which the user may manage various administrative features of the system. For example, as shown in FIG. 4F, the user may manage general settings for the network such as defining monitoring shifts 460 (e.g., start and end times, number of shifts monitored, etc.), application settings 462 (e.g., wager currency, time limits for generating off line reports, etc.), card game settings 464 (e.g., player and round naming conventions for reports), and roulette game settings 466 (e.g., player and round naming conventions for reports). In FIG. 4G, the administrator may manage different card game tables by naming new card game tables according to either a multi deck card game 470 or a single deck card game 472 as well as entering other information, such as the name of the game, the number of decks, the number of cards per deck, and an estimated average cards per round per player or dealer. In FIG. 4H, the administrator may manage different roulette tables by assigning different chip values permitted to be used by the a chip sorting device assigned to the roulette table.

Figure 5A:
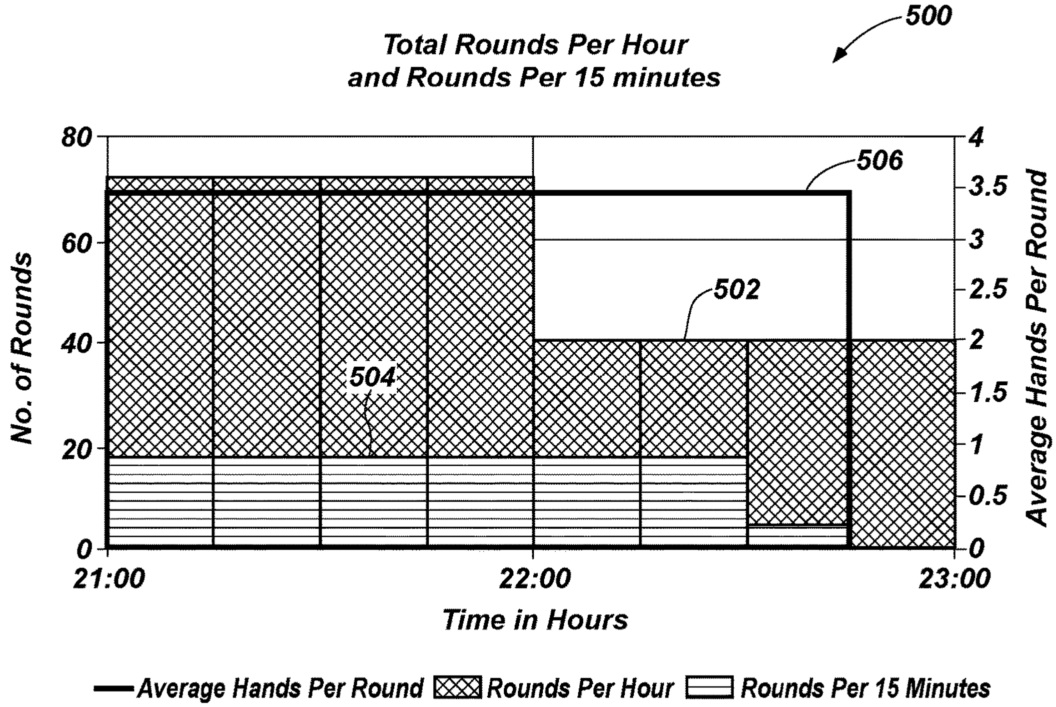
FIGS. 5A-5C are graphs of various representative off line reports that may be generated using game data from card handling devices.
Figure 5B:
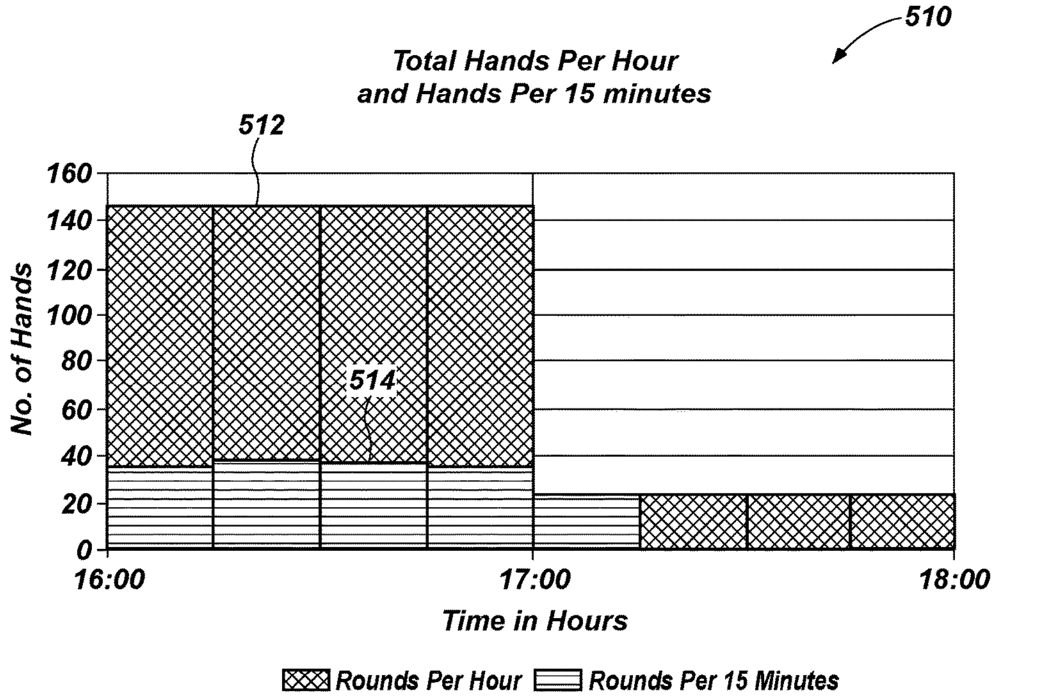
Figure 5C:
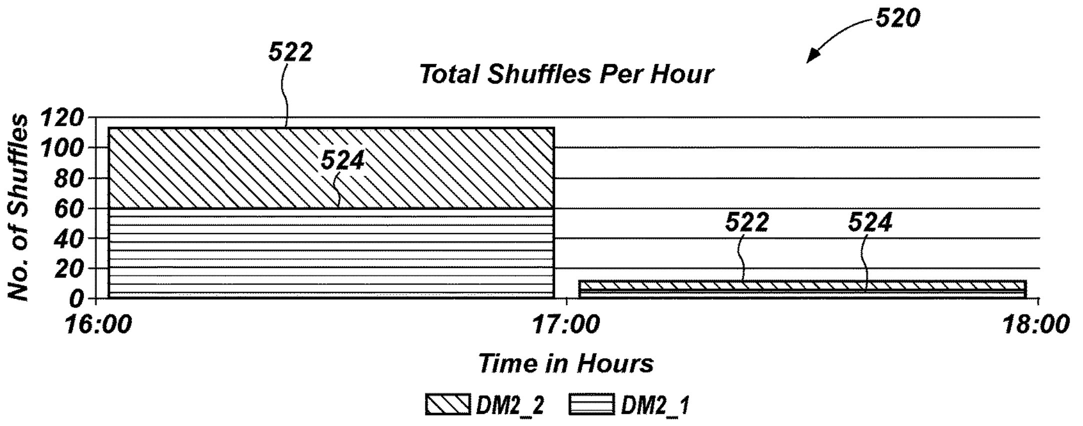

FIGS. 5A-5C are graphs 500-520 of various representative off line reports that may be generated using game data from card handling devices. FIGS. 6A-6D are graphs 600-630 of various representative off line reports that may be generated using game data from roulette tables. Such off line reports may be defined over a desired interval selected by the user. In some embodiments, the user may set up automatic reports to be generated according to a defined schedule (e.g., daily, weekly, etc.).

Referring specifically to FIG. 5A (graph 500), the total rounds per hour from a card handling device 110 may be displayed using bars 502 as compared with the total number of rounds per 15 minutes using bars 504. In addition, line 506 is overlaid onto graph 500 showing the average number of hands per round. Referring specifically to FIG. 5B (graph 510), the total hands per hour from a card handling device 110 are displayed using bars 512 as compared with the total number of hands per 15 minutes using bars 514. Generating such reports using other metrics (e.g., total number of shuffles, total number of cards dealt, etc.) are also contemplated.

Referring specifically to FIG. 5C (graph 530), game data from multiple different card handling devices 110 may be compared in the same report. For example, the total number of shuffles per hour of a first card handling device 110 may be displayed using bars 522 in comparison to the total number of shuffles per hour of a second card handling device 110 displayed using bars 524. Of course, other metrics (e.g., total rounds, total cards dealt, total hands, etc.) are also contemplated for such reports of comparing game data between multiple gaming devices 110 over the same time interval.

Figure 6A:
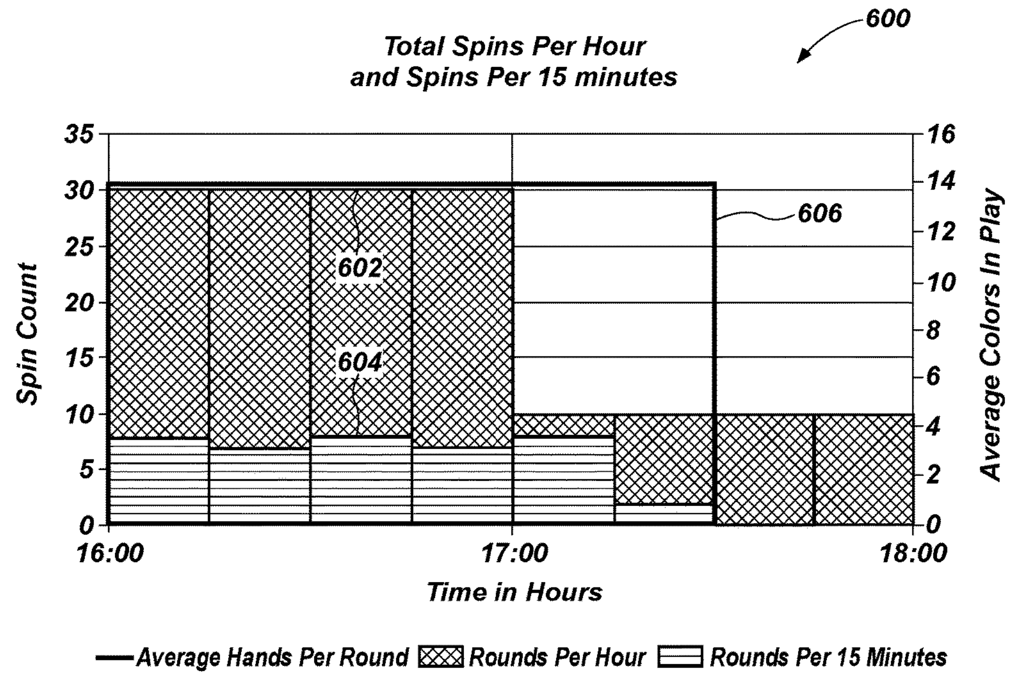
FIGS. 6A-6D are graphs of various representative off line reports that may be generated using game data from roulette tables.
Figure 6B:
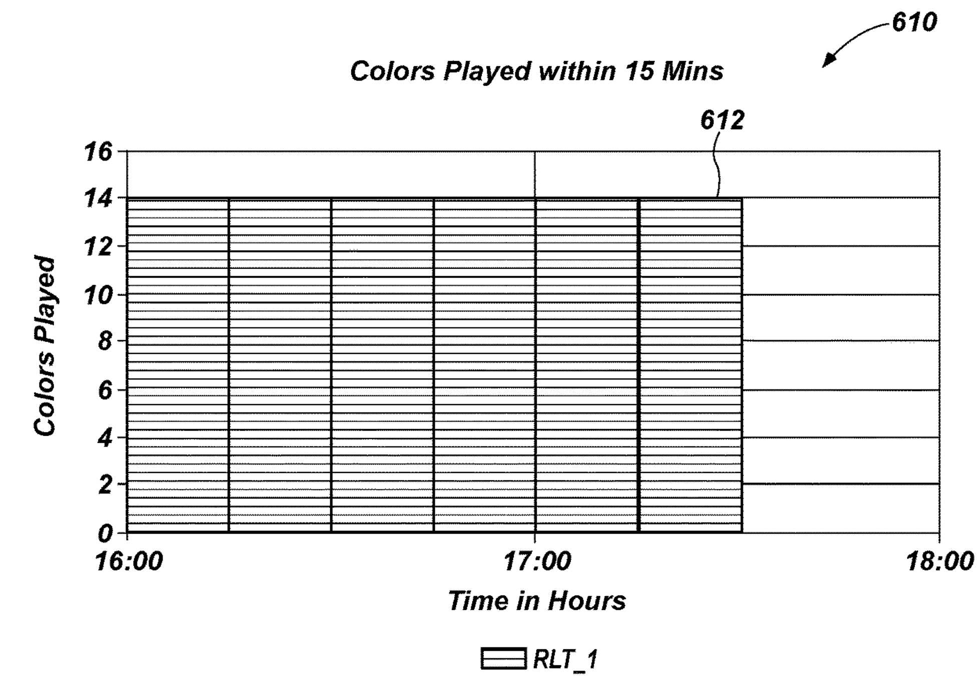
Figure 6C:
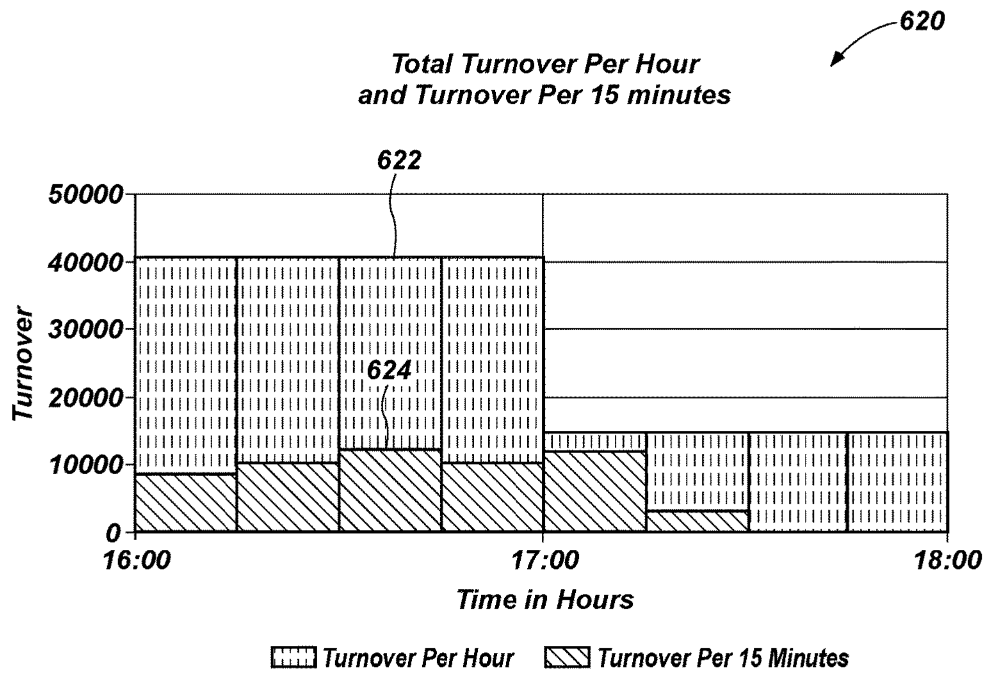

Referring specifically to FIG. 6A (graph 600), total spins per hour from a roulette table may be displayed using bars 602 as compared with the total number of spins per 15 minutes using bars 604. In addition, line 606 is overlaid onto graph 600 showing the average number of colors (i.e., players) per play. Referring specifically to FIG. 6B (graph 610), the total colors (i.e., players) per 15 minutes from a roulette table are displayed using bars 612. Referring specifically to FIG. 6C (graph 620), total turnover (i.e., revenue) per hour from a roulette table may be displayed using bars 622 as compared with the total number of turnover per 15 minutes using bars 624.

Figure 6D:
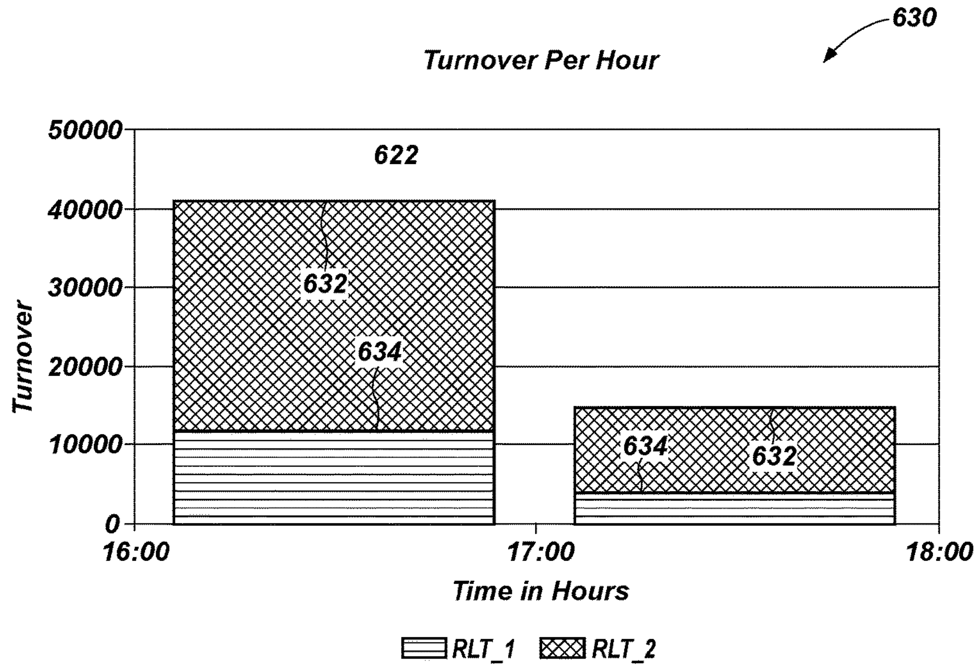

Referring specifically to FIG. 6D (graph 630), game data from multiple different roulette tables may be compared in the same report. For example, the total turnover per hour of a first roulette table may be displayed using bars 632 in comparison to the total turnover per hour of a second roulette table displayed using bars 634. Of course, other metrics (e.g., total colors, total spins, etc.) are also contemplated for such reports of comparing game data between multiple roulette tables over the same time interval.

Specific embodiments have been shown by way of example in the drawings and have been described in detail herein; however, the invention may be susceptible to various modifications and alternative forms. It should be understood that the invention is not limited to the particular forms disclosed. Rather, the invention includes all modifications, equivalents, derivatives and alternatives within the scope of the invention as defined by the following appended claims and legal equivalents.

What is claimed is:

1. In an environment including a communication network and a plurality of casino table games which have associated electronic card handling devices, each adapted to generate card handling performance data and an area identifier indicating an area including the respective card handling device within the environment, a monitoring system comprising:

a monitoring server in communication with the communication network and programmed to receive the area identifiers and the card handling performance data from the electronic card handling devices in real-time during operation thereof, the card handling performance data selected from the group consisting of one or more of shuffling data, game hand data, card dealing/distribution data, game round data, and game outcome data; and an operator station in communication with the monitoring server and including a user input device and a video display;

wherein at least one of the monitoring server or the operator station is configured to:

associate each electronic card handling device's received performance data and the respective area identifier with the corresponding electronic card handling device generating the performance data;

receive, via the user input device, user input including a selected area of interest within the environment and one or more user-defined settings;

in response to at least some of the user input, identify the electronic card handling devices associated with a common area identifier corresponding to the selected area of interest; and control, based at least partially on the one or more user-defined settings, the operator station video display to display a graphical user interface including simultaneously displaying graphical representations of the performance data associated with the identified electronic card handling devices, the performance data including at least one report depicting a comparison of real-time operational data for at least two card handling devices of the identified electronic card handling devices, wherein the performance data associated with the electronic card handling devices having area identifiers different from the common area identifier is filtered from the display in response to the user selection.

2. The monitoring system of claim 1, wherein at least one of the monitoring server or the operator station is further configured to display a table representative icon associated with each table game.

3. The monitoring system of claim 2, wherein the table representative icons for each of the different table games include icons for sub-components of at least one card handling device.

4. The monitoring system of claim 3, wherein the selected performance data includes game hand data and sub-components of the at least one card handling device includes a card recognition system for the at least one card handling device.

5. The monitoring system of claim 2, wherein the table representative icons are arranged in a pit area of the graphical user interface.

6. The monitoring system of claim 1, wherein the graphical user interface further includes an events area configured to display one or more log entries for game events in real-time for different gaming casino gaming devices.

7. The monitoring system of claim 1, wherein the performance data group includes real-time operational parameters of total rounds of play per time period, total player hands dealt per time period, total cards dealt per time period, total shoes per time period, and game outcome data.

8. The monitoring system of claim 1, wherein at least one of the monitoring server and operator station is further configured to control the video display to display graphics comparing the selected performance data of a first gaming device to a second gaming device over a same time interval in real-time.

9. A method of gathering and maintaining operational performance indicators for a plurality of casino table devices operably coupled to a casino network including a middleware server and a client terminal, the method comprising:

for each of the plurality of casino table devices, generating associated operational performance indicators and an area identifier indicating an area including a respective card handling device within an environment including the plurality of casino tables;

storing the operational performance indicators and the area identifiers gathered from the plurality of casino table devices in a game operation database at the middleware server, each area identifier associated with the operational performance indicators of the respective card handling device within the game operation database;

in response to receiving a selected casino device type and a requested area identifier from the client terminal at the middleware server in real-time during operation of the client terminal, generating, based at least partially on one or more user-defined control settings, a response data set including at least some of the operational performance indicators related to two or more of the plurality of casino table devices of the selected casino device type and being associated with an area identifier matching the requested area identifier, and transmitting the response data set to the requesting client terminal, wherein the operational performance indicators associated with the area identifiers not matching the requested area identifier are filtered from the response data; and processing and presenting the response data set in real-time at one or more output devices of the client terminal, the response data set including a first report including real-time operational performance indicators for at least one casino table device of the two or more casino table devices and a second report including a comparison of operational performance indicators of at least two casino table devices of the two or more casino table devices.

10. The method of claim 9, wherein the casino table devices include at least one of an automatic card shuffler or a bet sensor.

11. The method of claim 9, wherein storing the operational performance indicators gathered from the plurality of casino table devices occurs in real-time.

12. The method of claim 9, wherein presenting the response data icon representations for the plurality of casino table devices arranged in a casino floor layout of a graphical user interface.

13. The method of claim 9, wherein the request includes a table device identifier used to retrieve associated operational performance indicators for at least one of the plurality of casino table devices.

14. The method of claim 9, wherein the operational performance indicators for each of the plurality of casino table devices includes real-time recordation of one or more of a time and date; an operational status; card counts or values; a number of completed hands or games; a number of cards, hands, decks or shoes used, remaining, dealt, shuffled, discarded, or burned; a number of recorded game events; a number of hands won or lost; a game type; on-duty personnel administering the game; player occupancy information; player bet amounts; bet limits; table transactions; inventory levels; and combinations thereof.

15. The method of claim 9, wherein a particular time period or duration is specified in the request to filter the operational performance indicators for the at least one of the plurality of casino table devices.

16. The monitoring system of claim 8, wherein the same time interval is per hour.

17. The monitoring system of claim 8, wherein at least one of the monitoring server or the operator station is further configured to control the operator station video display to display an alert responsive to detecting in real-time the selected performance data exceeding a predetermined threshold.

18. The monitoring system of claim 8, wherein at least one of the monitoring server or the operator station is further configured to control the operator station video display to display an alert responsive to detecting in real-time the selected performance data deviating from a theoretical value.

* * * * *